US012078723B2

(12) United States Patent
Khatana et al.

(10) Patent No.: US 12,078,723 B2
(45) Date of Patent: *Sep. 3, 2024

(54) SYSTEMS AND METHODS FOR CHIRP LINEARIZATION USING A PARTIAL REFLECTOR AS A REFERENCE REFLECTOR

(71) Applicant: VELODYNE LIDAR USA, INC., San Jose, CA (US)

(72) Inventors: Sunil Khatana, Sunnyvale, CA (US); Tyler Banas, Alameda, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 17/318,624

(22) Filed: May 12, 2021

(65) Prior Publication Data

US 2022/0373681 A1    Nov. 24, 2022

(51) Int. Cl.
*G01C 3/08* (2006.01)
*G01S 17/14* (2020.01)
*G01S 17/26* (2020.01)
*G01S 17/48* (2006.01)
*G01S 17/32* (2020.01)

(52) U.S. Cl.
CPC .............. *G01S 17/26* (2020.01); *G01S 17/14* (2020.01); *G01S 17/48* (2013.01); *G01S 17/32* (2013.01)

(58) Field of Classification Search
CPC ................................ G01S 17/32; G01S 7/4911
See application file for complete search history.

(56) References Cited

U.S. PATENT DOCUMENTS

| 5,781,297 | A | * | 7/1998 | Castore | G01B 11/2441 |
| | | | | | 356/486 |
| 6,384,770 | B1 | | 5/2002 | De Gouy et al. | |
| 11,296,483 | B2 | * | 4/2022 | Rakuljic | H01S 5/4012 |
| 2019/0257950 | A1 | | 8/2019 | Patanwala et al. | |
| 2021/0156999 | A1 | * | 5/2021 | Nishino | G01S 7/481 |
| 2021/0318436 | A1 | * | 10/2021 | Boloorian | G01S 7/4913 |

FOREIGN PATENT DOCUMENTS

| CA | 3146353 | * | 2/2021 | G01C 3/06 |
| WO | 2020076402 | A1 | 4/2020 | |

OTHER PUBLICATIONS

PCT/US2022/028968, "International Search Report and Written Opinion", Aug. 30, 2022, 10 pages.

* cited by examiner

*Primary Examiner* — Mark Hellner
(74) *Attorney, Agent, or Firm* — Kilpatrick Townsend & Stockton LLP

(57) ABSTRACT

Disclosed herein are systems and methods for linearizing frequency chirp in a frequency-modulated continuous wave (FMCW) coherent LiDAR system. Exemplary methods can include generating a continuous wave laser signal having a frequency characteristic, in which the frequency characteristic can include a frequency chirp over a frequency band in at least one period; and receiving a signal based on the generated laser signal. The methods can further include mixing the received signal with a local oscillator signal, the local oscillator signal having the frequency characteristic; determining at least one beat frequency based on the mixed signal; sampling the mixed signal at a rate equal to at least two times the beat frequency; determining a correction signal based on the sampled signal; and applying the correction signal to the laser signal.

19 Claims, 24 Drawing Sheets

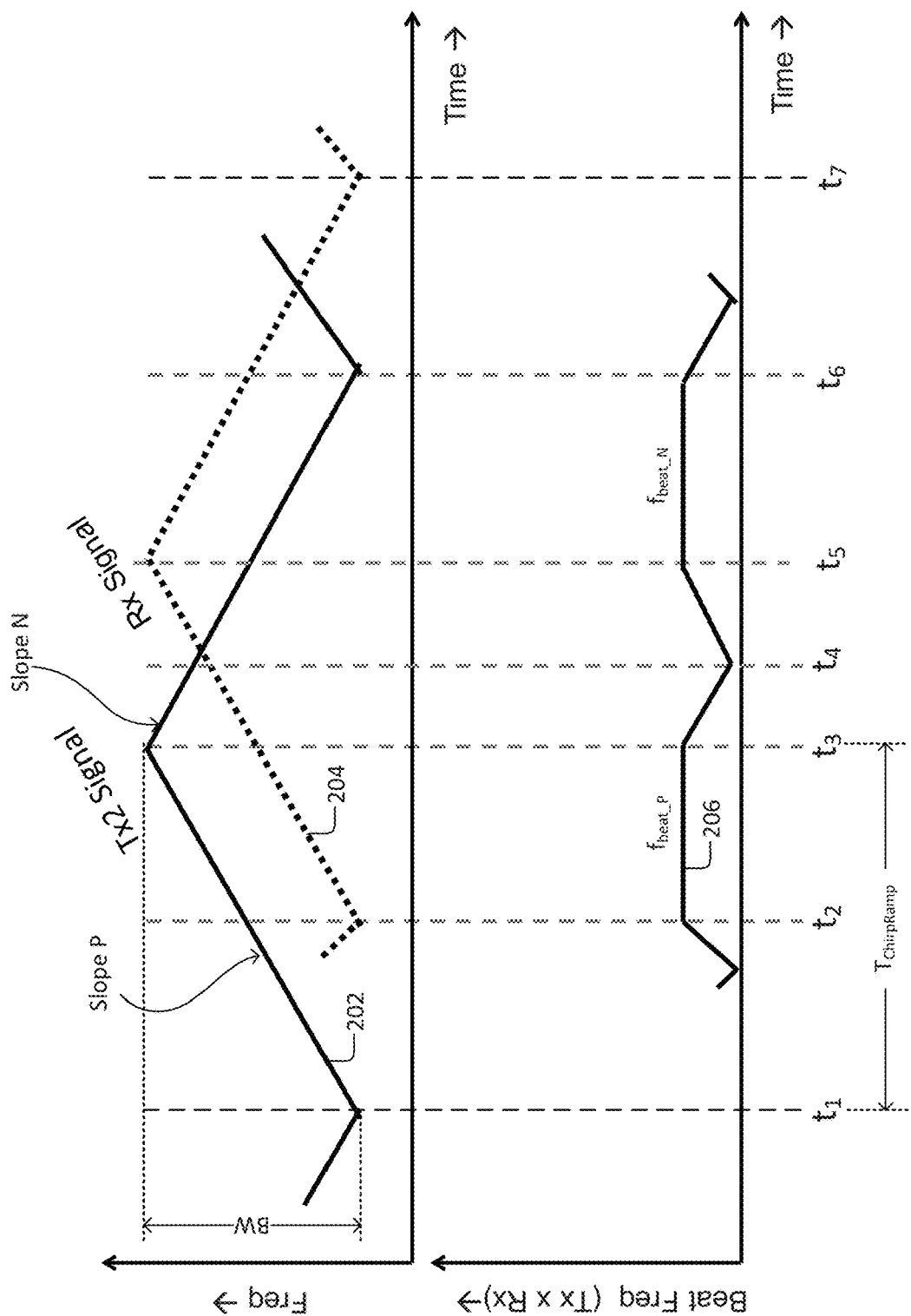

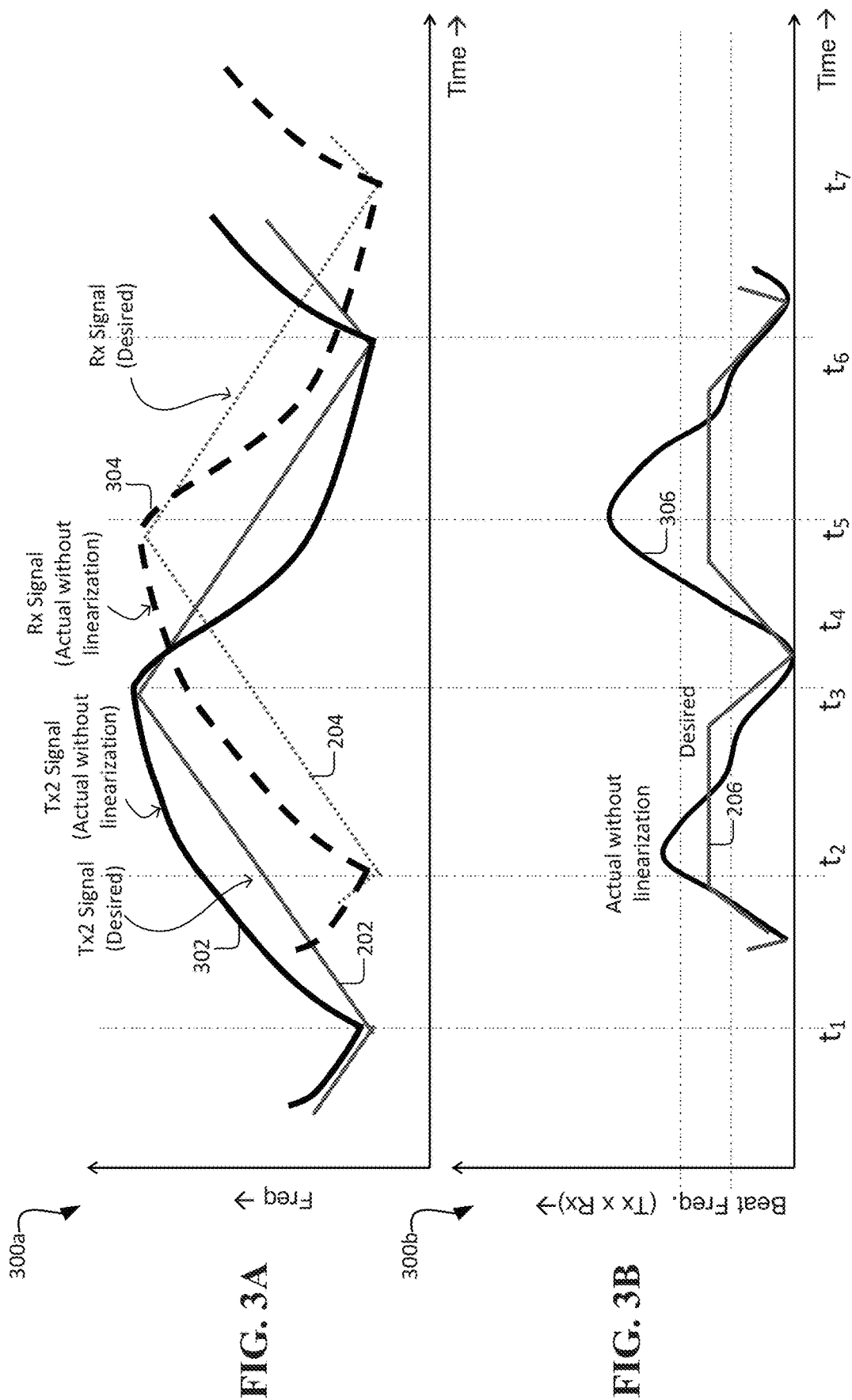

SYSTEMS AND METHODS FOR CHIRP LINEARIZATION USING A PARTIAL REFLECTOR AS A REFERENCE REFLECTOR

TECHNICAL FIELD

The present disclosure features frequency modulated continuous wave (FMCW) coherent LiDAR systems and, in particular, systems and methods for linearization of chirp in FMCW coherent LiDAR systems.

BACKGROUND

Some LiDAR systems employ a continuous wave (CW) laser to detect the range and/or velocity of targets. Examples of such systems include frequency modulated continuous wave (FMCW) coherent LiDARs.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Systems and methods for linearization of chirp in LiDAR systems are disclosed. In one aspect, disclosed herein are methods for linearizing frequency chirp in a frequency-modulated continuous wave (FMCW) coherent LiDAR system. The methods can include generating a continuous wave laser signal having a frequency characteristic, in which the frequency characteristic can include a frequency chirp over a frequency band in at least one period; and receiving a signal based on the generated laser signal. The methods can further include mixing the received signal with a local oscillator signal, the local oscillator signal having the frequency characteristic; determining at least one beat frequency based on the mixed signal; sampling the mixed signal at a rate equal to at least four times the beat frequency; determining a correction signal based on the sampled signal; and applying the correction signal to the laser signal.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIG. 2A is a plot of ideal (or desired) frequency chirp as a function of time in the laser signal and reflected signal. FIG. 2B is a plot illustrating the corresponding ideal beat frequency of the mixed signal.

FIG. 3A is a plot of the ideal frequency chirp in transmitted and received signals, as depicted in FIG. 2A, and an example actual signal from laser and an example realized or actual reflected signal. FIG. 3B is a plot illustrating the corresponding beat frequency of the actual mixed signal.

Figure 1:
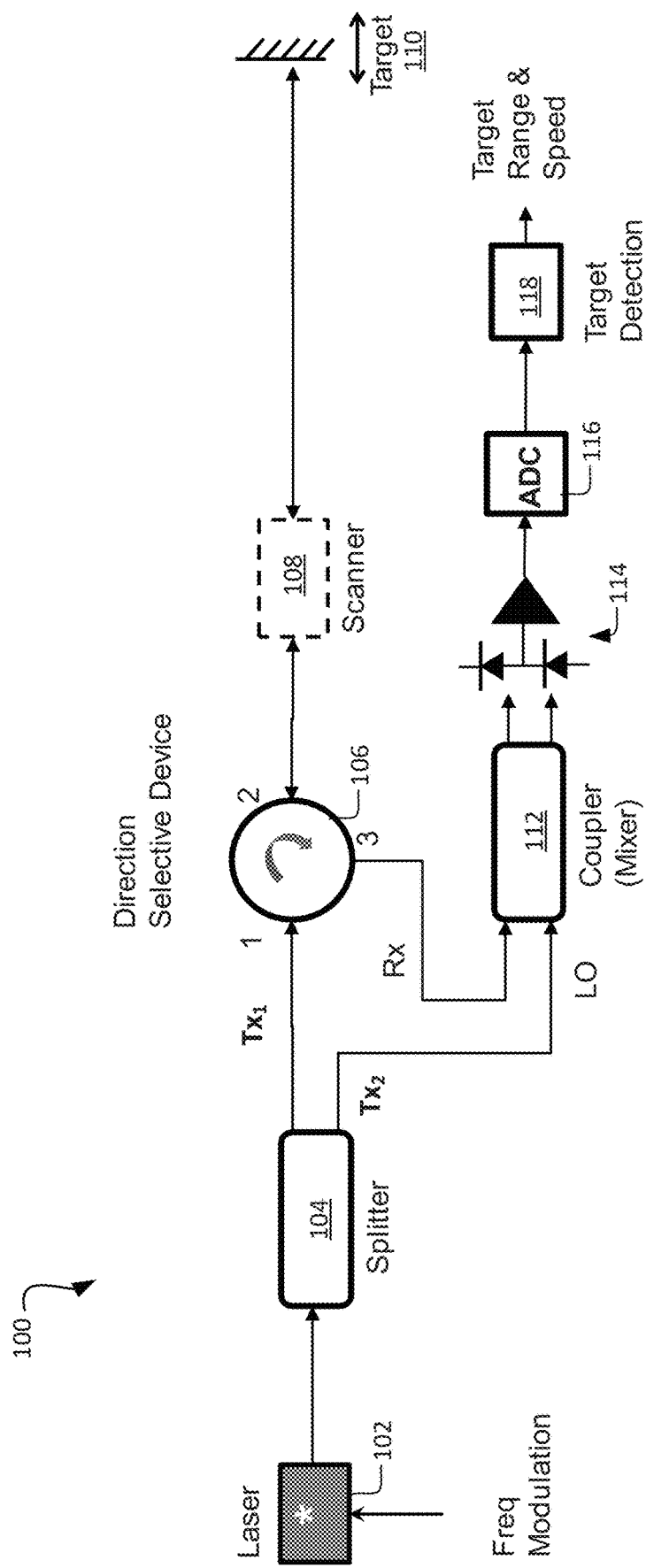
FIG. 1 is a diagram of an exemplary FMCW coherent LiDAR system configured to determine the range and/or speed of a target.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Systems and methods for linearization of chirp in coherent LiDAR systems are disclosed. Range (e.g., distance) and/or velocity measurements in frequency modulated continuous wave (FMCW) coherent LiDAR may rely on linear chirp. In particular, the resolution of the range and/or velocity measurements can be affected by chirp linearity. As described in further detail below, various exemplary systems and methods may linearize chirp in FMCW coherent LiDAR systems by one or more of the following techniques:

(i) oversampling;

(ii) use of two CW lasers; or (iii) use of a reference reflector, e.g., a partial field-of-view (FOV), a partial reflector, or an externally positioned reflector.

One or more exemplary systems and methods for chirp linearization in FMCW coherent LiDAR systems may be employed by autonomous or semi-autonomous vehicles, including passenger vehicles, industrial robots, aerial vehicles, underwater vehicles, etc. for the detection of objects and/or navigation through space. Note that the following description of the exemplary LiDAR systems and methods may be in the context of autonomous vehicles but it is understood that the same principles can be applied to other applications and contexts employing object detection and/or navigation.

Overview of FMCW Coherent LiDAR Systems

FIG. 1 illustrates an exemplary FMCW coherent LiDAR system 100 configured to determine the range and/or speed of a target. LiDAR system 100 includes a laser 102 configured to produce a laser signal which is fed into a splitter 104. The laser is "chirped" (e.g., ramped up, ramped down, etc.) such that the laser frequency is changed with time over a frequency band. In various embodiments, the laser frequency is chirped quickly such that multiple phase angles are attained. Note that some FMCW LiDAR systems can be configured to detect velocity (both magnitude (speed) and direction) of the movement of a target.

Note that laser chirping is beneficial for range (distance) measurements of the target. In comparison, Doppler frequency measurements are typically used for target velocity. Resolution of distance can depend on the bandwidth size of the chirp frequency band such that greater bandwidth corresponds to finer resolution, according to the following relationships:

Range resolution:

$$\Delta R = \frac{c}{2BW} \text{ (given a perfectly linear chirp)}$$

$$\text{Range: } R = \frac{f_{Beat} c \, T_{ChirpRamp}}{2 \, BW}$$

where c is the speed of light, BW is the bandwidth size of the chirped laser signal, $f_{Beat}$ is the beat frequency (as discussed further below), and $T_{ChirpRamp}$ is time for the up-ramp portion of the chirped laser. For example, for a distance resolution of 1.9 cm, a frequency bandwidth of 8 GHz is used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent LiDAR systems may rely on two measurements having different slopes (e.g., negative and positive slopes) to remove this ambiguity. The two measurements having different slopes may also be used to determine range and velocity measurements simultaneously.

The positive slope ("Slope P") and the negative slope ("Slope N") (also referred to as positive ramp and negative ramp, respectively) can be used to determine range and/or velocity. In some instances, referring to FIGS. 2A-2B, when the positive and negative ramp pair is used to measure range and velocity simultaneously, the following relationships are utilized:

$$\text{Range: } R = \frac{cT_{ChirpRamp} \frac{(f_{beat\_P} + f_{beat\_N})}{2}}{2BW}$$

$$\text{Velocity: } V = \frac{\lambda \frac{(f_{beat\_P} - f_{beat\_N})}{2}}{2}$$

where $f_{beat\_P}$ and $f_{beat\_N}$ are beat frequencies generated during positive (P) and negative (N) slopes of the chirp 202 respectively and λ is the wavelength of the laser signal.

In various embodiments, the laser frequency is chirped as linearly as possible. For example, the chirp is generated up and/or down with constant slope, which may be referred to as triangle chirp. Other types of chirp include sawtooth, sinusoidal, etc. However, as discussed below, the linearity of chirp may be challenging to achieve due to the thermal dynamics and/or charge saturation effects of the laser 102. For instance, controlled linear chirping may be difficult to achieve in narrow linewidth coherent lasers by direct modulation and, in some cases, may require external modulation of the laser 102. However, an external modulator can add loss, complexity, cost, and/or footprint (increased size) to the LiDAR system. Further, even with external modulation, chirp characteristics may suffer from non-linearities due to a non-ideal drive signal and/or modulator device characteristics. The exemplary systems and methods described herein address this challenge of chirp linearization.

Referring again to FIG. 1, splitter 104 provides a first split laser signal $Tx_1$ to a direction selective device 106, which forwards the signal $Tx_1$ to a scanner 108. The scanner 108 uses the first laser signal $Tx_1$ to transmit light and receive reflections back from the target 110. The reflected signal Rx is passed back to the direction selective device 106. The second laser signal $Tx_2$ and reflected signal Rx is provided to a coupler (also referred to as a mixer) 112. The second laser signal $Tx_2$ is used as a local oscillator (LO) signal and mixed with the reflected signal Rx. The mixer 112 is configured to mix the reflected signal Rx with the local oscillator signal LO to generate a beat frequency $f_{beat}$. The mixed signal with beat frequency $f_{beat}$ is provided to a differential photodetector 114 configured to produce a current based on the received light. The current is converted to voltage by a transimpedance amplifier (TIA) and fed to an analog-to-digital converter (ADC) 116 configured to convert the analog signal to digital samples for the target detection stage 118. Stage 118 is configured to generate the range and/or speed of the target 110 based on the digital sampled signal with beat frequency (beat.

FIG. 2A is a plot of ideal (or desired) frequency chirp as a function of time in the laser signal Tx (e.g., signal $Tx_2$), depicted in solid line 202, and reflected signal Rx, depicted in dotted line 204. As depicted, the ideal Tx signal has a positive linear slope between time $t_1$ and time $t_3$ and a negative linear slope between time $t_3$ and time $t_6$. Accordingly, the ideal Rx signal returned with a time delay $t_d$ of approximately $t_2-t_1$ has a positive linear slope between time $t_2$ and time $t_5$ and a negative linear slope between time $t_5$ and time $t_7$.

FIG. 2B is a plot illustrating the corresponding ideal beat frequency $f_{beat}$ 206 of the mixed signal $Tx_2 \times Rx$. Note that the beat frequency $f_{beat}$ 206 has a constant value between time $t_2$ and time $t_3$ (corresponding to the overlapping up-slopes of signals $Tx_2$ and Rx) and between time $t_5$ and time $t_6$ (corresponding to the overlapping down-slopes of signals $Tx_2$ and Rx).

However, actual chirping is not as linear or not completely linear as in the ideal cases illustrated in FIGS. 2A-2B. This nonlinearity may cause serious errors in its measurements and/or lead to missing a target altogether. FIG. 3A is a plot 300a of the ideal frequency chirp in laser signal $Tx_2$ (solid line 202) and return signal Rx (dotted line 204), as depicted in FIG. 2A, and an example realized (or actual) signal $Tx_2$ (solid line 302) from laser 102 and an example realized (or actual) reflected signal Rx (dashed line 304). As illustrated, the chirp in the actual signal 302 has a roughly similar sawtooth shape to the ideal signal 202 but the slope of actual signal 302 between time $t_1$ and time $t_3$ is not as linear as the slope of signal 202. Analogously, the shape of the actual reflected signal 304 tracks the shape of the actual signal Tx 302 and therefore lacks an entirely linear slope.

FIG. 3B is a plot illustrating the corresponding beat frequency 306 of the actual mixed signal $Tx_2 \times Rx$. Similarly, the actual beat frequency 306 strays from ideal or desired beat frequency 206, making accurate and/or precise measurements of range difficult to attain.

Figure 3C:
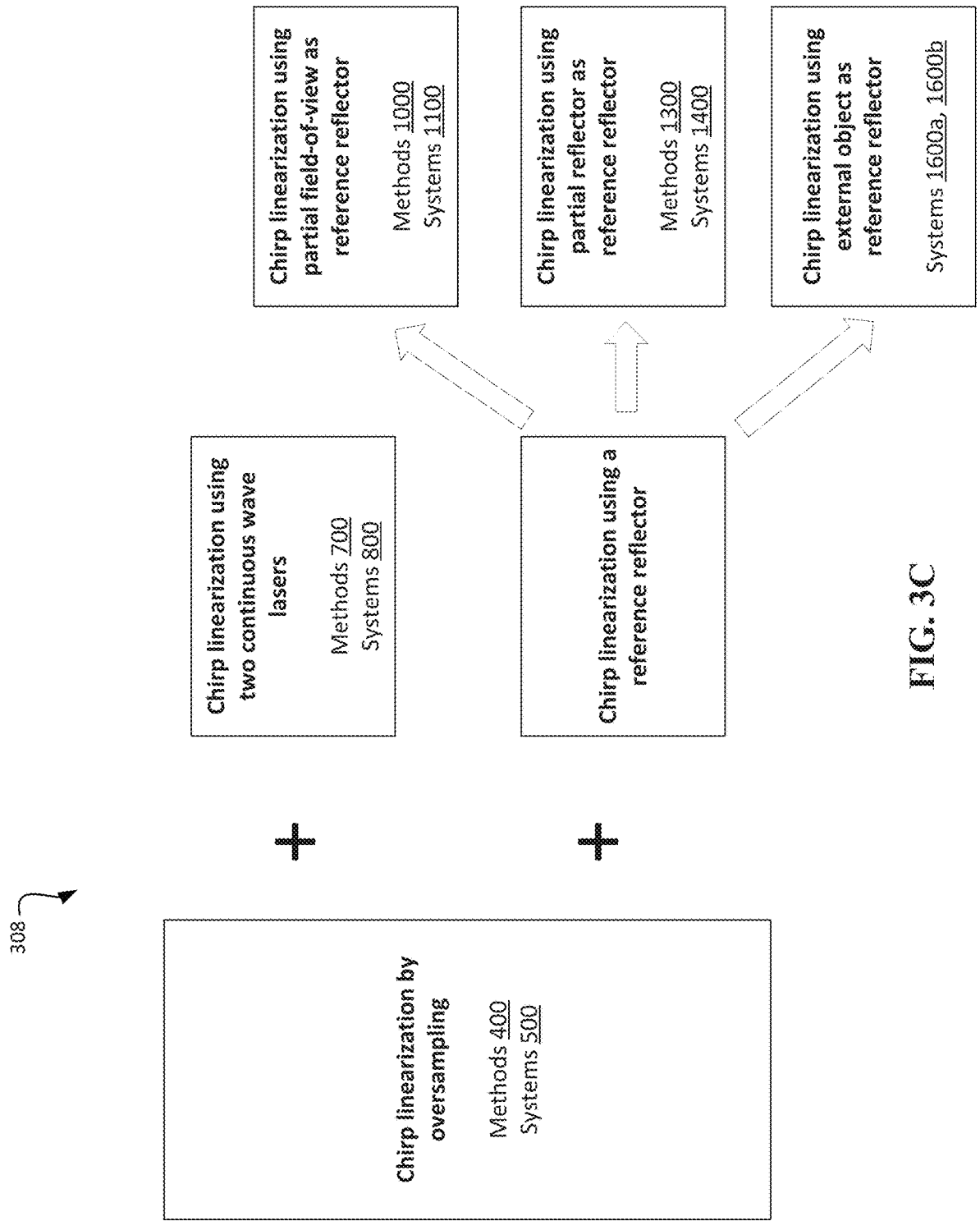
FIG. 3C is a diagram of various methods and systems for chirp linearization.

Accordingly, various systems and methods are discussed below for the linearization of chirp in coherent LiDAR systems. Referring to FIG. 3C, linearization of chirp 308 can include:

Systems and methods for chirp linearization by oversampling (refer to methods 400 and systems 500);
Systems and methods for chirp linearization using two continuous wave (CW) lasers (refer to methods 700 and systems 800);
Systems and methods for chirp linearization using partial field-of-view (FOV) as a reference reflector (refer to methods 1000 and systems 1100); and/or
Systems and methods for chirp linearization using a partial reflector as a reference reflector (refer to methods 1300 and systems 1400).

Systems and methods for chirp linearization using external reflector(s) as a reference reflector (refer to systems 1600a, 1600b).

As illustrated, linearization of chirp 308 can be achieved by combining one or more of the above systems and methods. In some embodiments, chirp linearization by oversampling can be combined with one or more of: (i) linearization using two CW lasers; (ii) linearization using partial field-of-view (FOV) as a reference reflector; or (iii) linearization using reflected signals from a partial reflector.

Linearization of Chirp by Oversampling

In some embodiments, an FMCW coherent LiDAR system may leverage a feedback mechanism to control chirp linearization. For instance, the feedback mechanism can include oversampling of the mixer output to enable time-resolved frequency measurement. This method can include chirping using direct frequency modulation of the laser 102 or using an external modulator.

Figure 4:
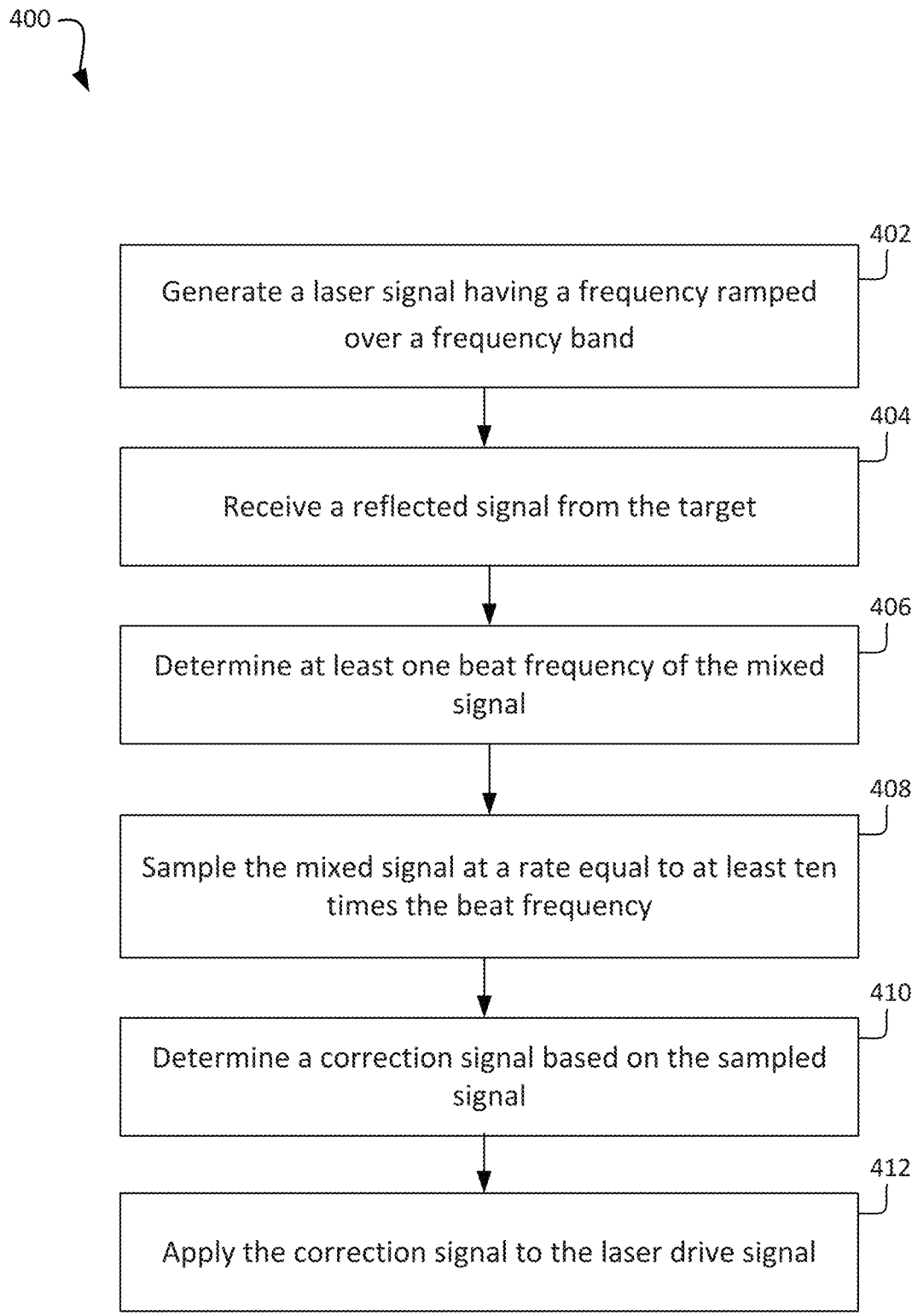
FIG. 4 is a flowchart of an exemplary method for chirp linearization by oversampling in FMCW coherent LiDAR systems.
Figure 5A:
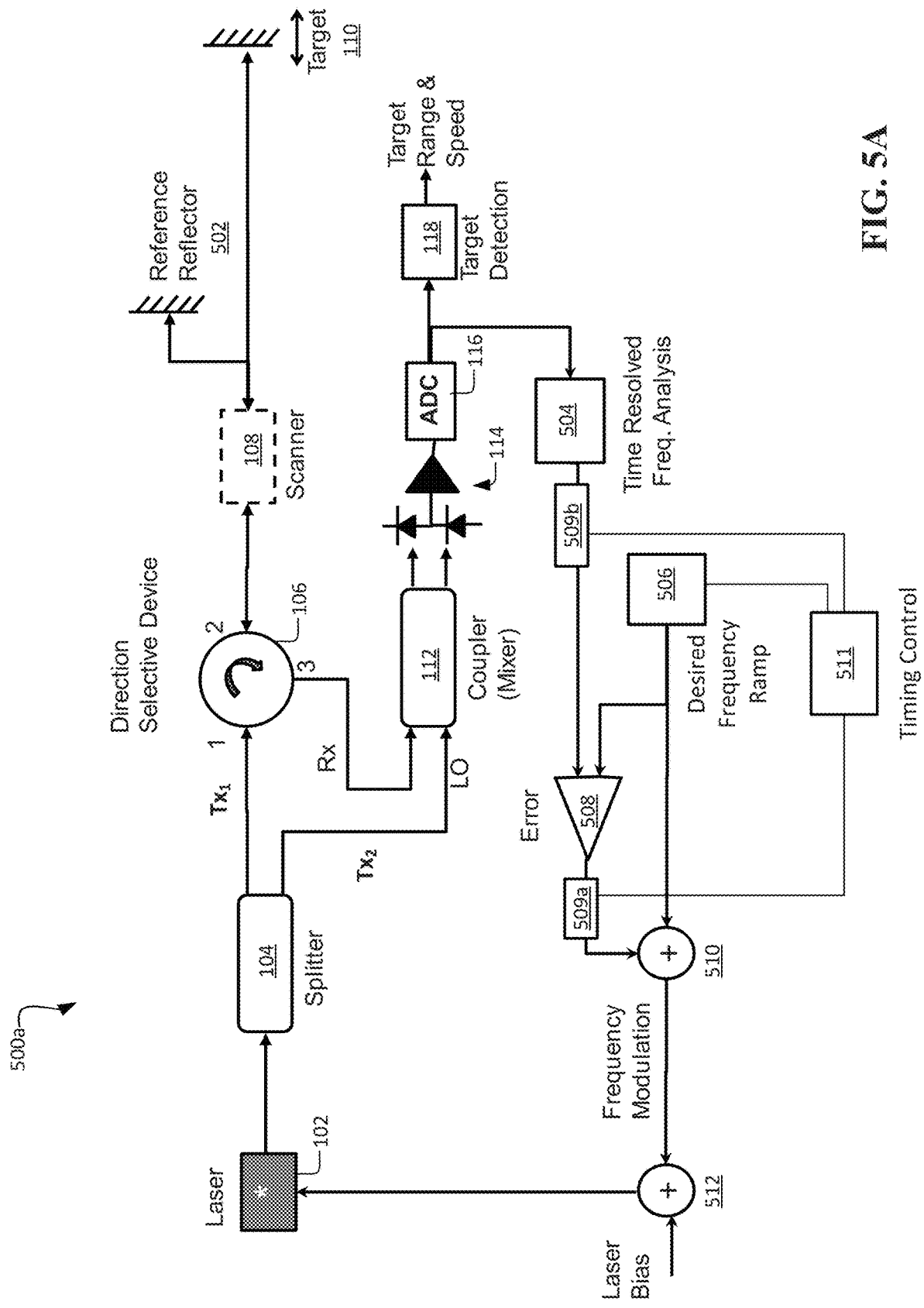
FIGS. 5A-5B are diagrams of embodiments of a coherent LiDAR system configured for chirp linearization via oversampling.
Figure 5B:
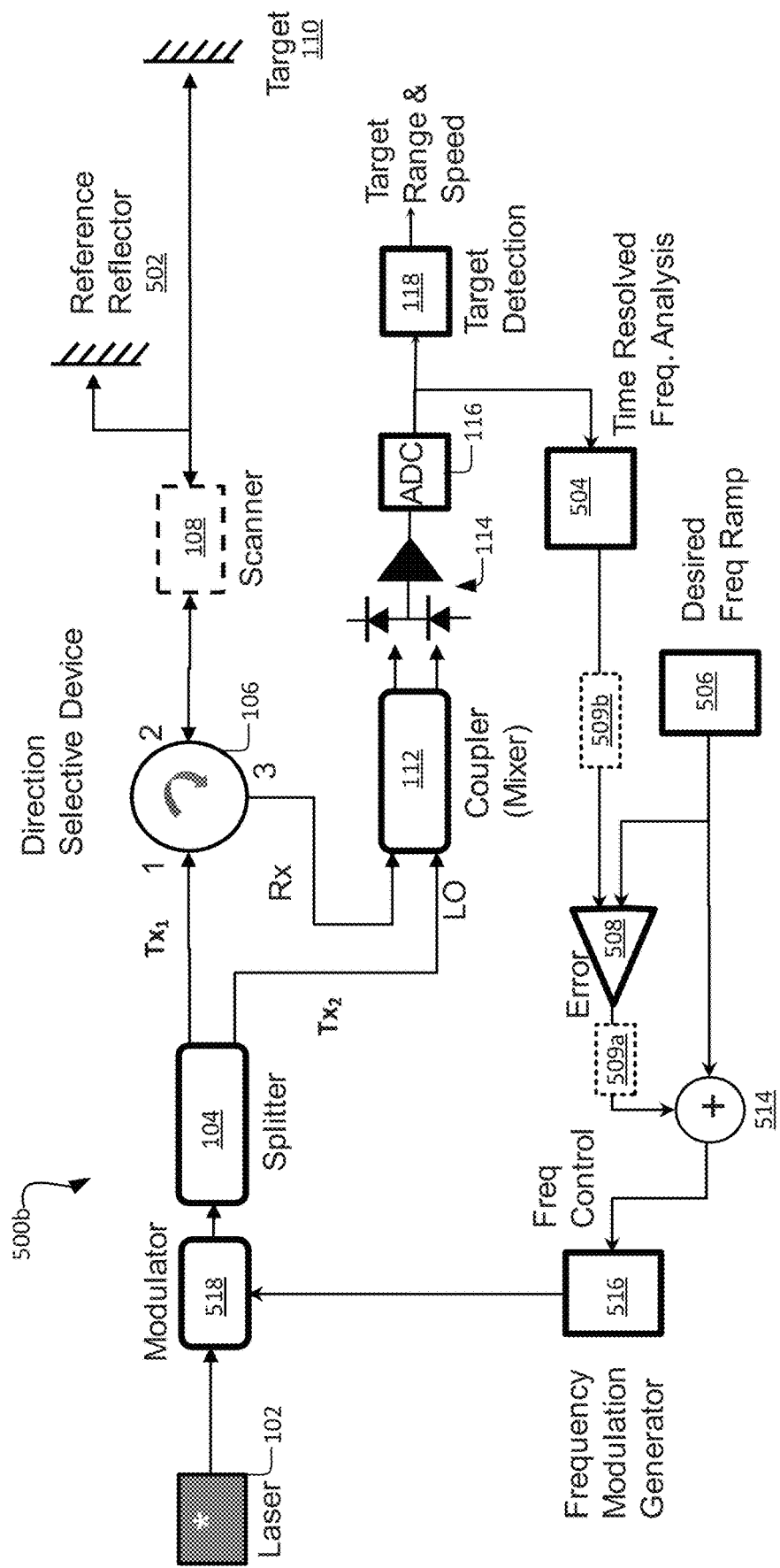
Figure 5C:
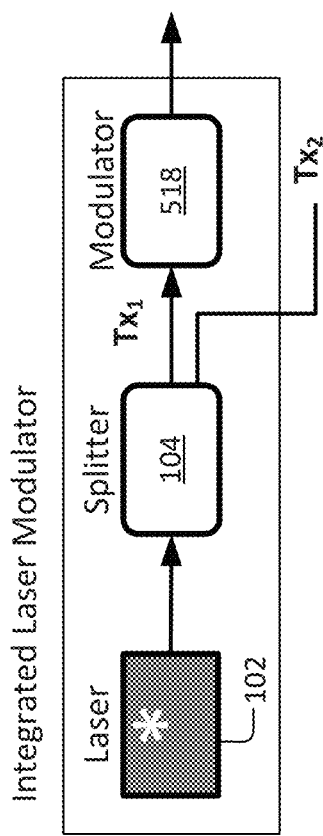
FIG. 5C is a diagram of an embodiment of a modulator in the coherent LiDAR system of FIG. 5B.
Figure 5D:
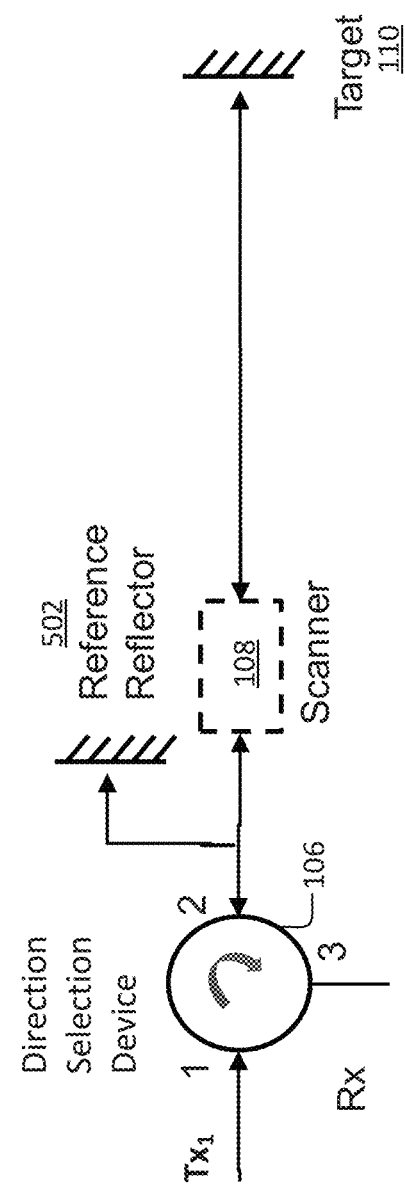
FIG. 5D is a diagram of an embodiment of a reference reflector in the LiDAR system of FIG. 5B.

FIG. 4 is a flowchart of an exemplary method 400 for chirp linearization by oversampling in FMCW coherent LiDAR systems. FIGS. 5A-5B illustrate two alternative embodiments of a coherent LiDAR system 500a, 500b (collectively referred to as 500) configured for chirp linearization via oversampling. FIG. 5C illustrates an alternative implementation of an integrated laser and modulator in the coherent LiDAR system 500b. FIG. 5D illustrates an alternative implementation of a reference reflector in the LiDAR system 500b. For the sake of clarity and conciseness, FIGS. 4-5D are discussed together below. Note that coherent LiDAR systems 500 may share one or more components and/or configuration similarities with system 100 and, accordingly, discussion of like elements will not be repeated here.

In step 402 of exemplary method 400, as described above, the laser signal Tx is generated by laser 102. The laser signal Tx has a frequency that is chirped (e.g., ramped up and ramped down) over a frequency band. In step 404, a reflected signal of the target is received by the scanner 108 and provided to the mixer 112 with an LO signal (e.g., $Tx_2$). The mixed signal can be sampled by the ADC 116. In step 406, the sampled signal is used by the processing unit 118 to determine one or more beat frequencies in the return signal. In particular, the processing unit 118 can execute one or more discrete Fourier transforms (DFTs) to determine the beat frequencies.

Figure 6A:
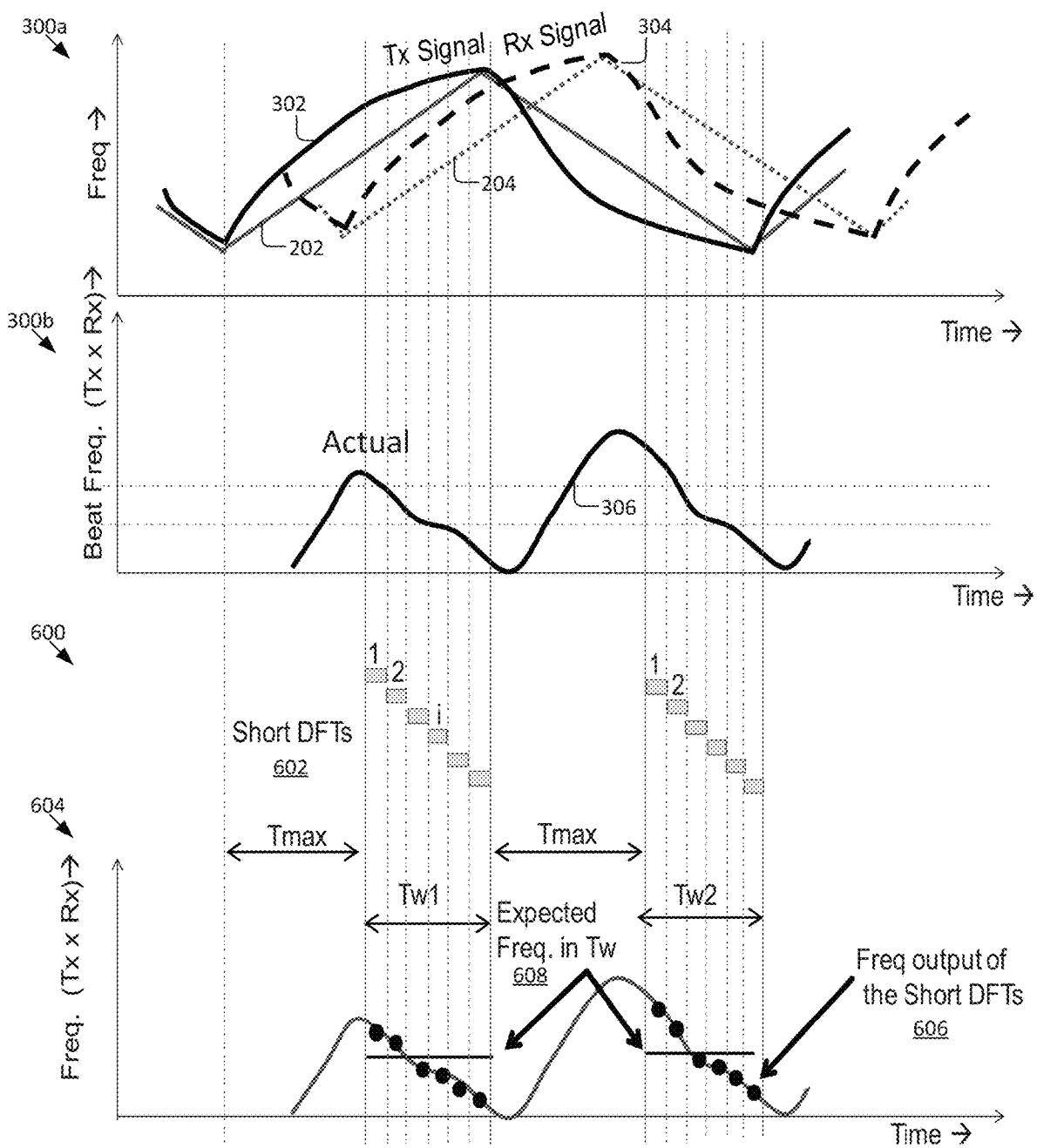
FIGS. 6A-6B are plots of a comparison to the exemplary short DFTs and a plot of the frequency output of the short DFTs as a function of time overlaid on actual beat frequency.

In FIG. 6A, plots 300a, 300b are provided in comparison to the exemplary short DFTs 602 and a plot 604 of the frequency output of the short DFTs as a function of time overlaid on actual beat frequency 306. Referring back to the exemplary LiDAR system 100, one large DFT (e.g., with time window size Tw1+Tw2) or two large DFTs (e.g., time window size Tw1 and Tw2) can be performed per pixel by the processing unit 118 to determine one or more beat frequencies present in the return signal from the target 110. These beat frequencies can be used to determine range and/or velocity of the target 110. In some embodiments, the processing unit 118 can determine the maximum beat frequency in the return signal. The maximum beat frequency may be determined by the longest range and/or fastest speed that system 500a is configured to measure. In some embodiments, the sampling rate of the ADC 116 is selected such that each DFT has the minimum number of sample points to provide the desired range resolution.

However, for chirp linearization in the exemplary step 408, the ADC 116 can be configured to oversample the mixed signal, e.g., at a rate greater than the beat frequency (e.g., at least two times, at least three times, at least four times, at least five times, at least ten times, at least 15 times, at least 20 times, at least 30 times, at least 50 times, etc.). In some embodiments, the ADC 116 is configured to oversample the maximum beat frequency (e.g., at least two times, at least three times, at least four times, at least five times, etc. the maximum beat frequency). For example, the ADC 116 may sample the mixed signal at a rate equal to at least ten times the maximum beat frequency. Note that the oversampling factor can depend on the maximum frequency content of the nonlinearity that the system is being configured to compensate. As illustrated in plot 600, the processing unit 118 can be configured to perform short DFTs 602 to assess a beat frequency in time intervals shorter than time window Tw1 and/or time window Tw2. For instance, dividing time window Tw1 or Tw2 in ten or more intervals can be preferable to attain a fine resolution frequency measurement. In some embodiments, DFTs 602 can be executed on disjoint data blocks back-to-back, on adjacent data blocks, and/or on overlapping data blocks to attain greater resolution (e.g., a greater number of correction points per time window). In some embodiments, the short DFTs may be sliding DFTs with overlap, resulting in more correction points and a smoother drive signal for the laser 102.

In step 410, the digitized signal from the ADC 116 is provided to a processing stage 504 configured to process the digitized signal using time-resolved sliding frequency analysis to determine an error signal (also referred to as the correction signal). As described in further detail below, the error signal can include the amount with which the frequency of the actual signal 306 deviates from the ideal signal 206. Referring to plot 604, the expected frequency 608 (e.g., the average frequency) over time window Tw1 and/or Tw2 can be used to determine the error, which in turn can be used correct the modulation drive ramp used to control the frequency of the laser 102. Accordingly, the method 400 can include determining the expected frequency 608 over one or more time windows. Additionally or alternatively, the expected value of the beat frequency from reference reflection surface 502 (coupled to the output of the scanner 108 in system 500a or 500b) may be used to determine the error. In some embodiments, the correction signal can be added repeatedly, continuously, periodically, or intermittently in a feedback loop during live operation in field (in-situ) and/or run as a separate calibration procedure at the start-up of the LiDAR system. For example, the feedback loop can be executed every cycle or after every N number of cycles (e.g., to save power and/or process time) in situ.

In step 412, the processed signal and a desired frequency ramp from generator 506 are provided to an error stage 508 to generate a correction (error) signal. In some embodiments, the desired frequency ramp is stored in a memory and accessed for use. In some embodiments, an average measured value (e.g., expected frequency 608) can be used to determine the desired frequency ramp. In particular, the error stage 508 is configured to compare the processed signal to the desired linear behavior of the ideal chirp.

Figure 6B:
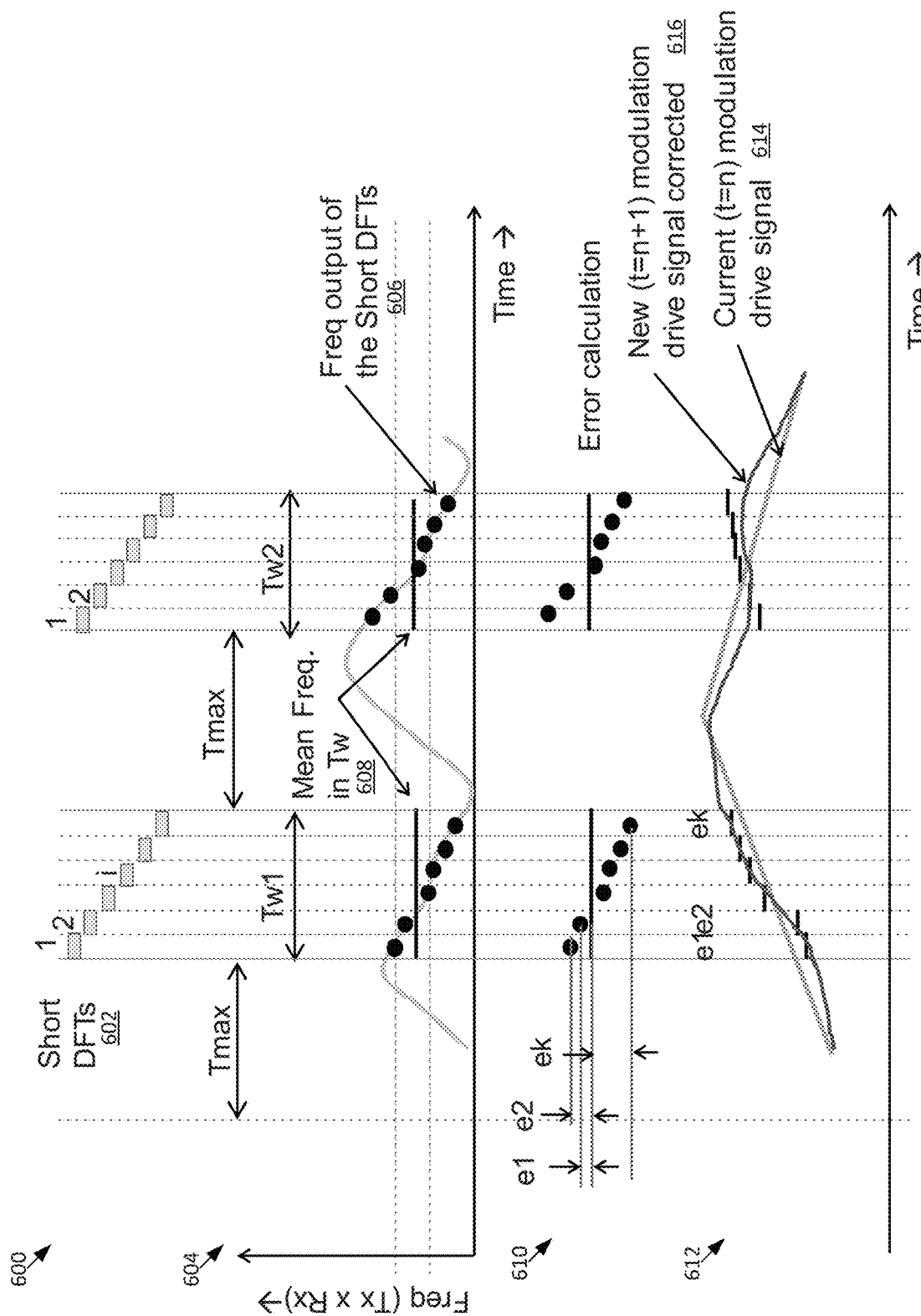

FIG. 6B illustrates error calculation and the correction of modulation drive to linearize the frequency modulation of laser 102. During error calculation, error signals e1, e2, . . . ek are determined for respective short DFT outputs 606. In various embodiments, error signal can be expressed as the difference between the expected frequency $f_{expected}$ and the measured frequency $f_{measured}$:

$$e_k = f_{expected} - f_{measured}$$

In some embodiments, each error signal is the deviation (e.g., frequency difference) between the mean frequency 608 and the respective short DFT output. In some embodiments, the error signal is the absolute value of the deviation from a reference signal (e.g., using the second CW laser signal as the reference signal, as described further below). As illustrated in plot 612, these error signals e1, e2, . . . ek are applied to the modulation drive signal 614 to form the corrected modulation drive signal 616.

Referring to exemplary system 500a, the correction signal and desired frequency ramp can be provided to a frequency modulation stage 510. Stage 510 adds the correction signal to the desired frequency ramp to form a corrected drive signal to drive the laser 102 in the next cycle, as described in further detail below). In some embodiments, the modulation drive signal to control the chirp or laser 102 is determined and/or updated according to the following relationship:

$$\text{modulation drive}[k,t=n+1] = \text{modulation drive}[k,t=n] + \mu * \text{Error}[k,t=n]$$

where k is the index for location on the ramp, n is ramp index, and μ is the feedback loop gain. The feedback loop gain can be used to control how aggressively the correction is applied to the laser drive signal. For instance, a higher value of μ causes faster convergence but has a larger fluctuation around the final value. Conversely, a lower value of μ causes slower convergence but has a smaller fluctuation around the final value.

In some embodiments, the correction is applied to the laser drive signal as soon as it is determined because, in some cases, it may be feasible to apply the correction with little or no delay. In some embodiments, a delay block is included to apply a delay to the error correction. For instance, the delay block 509a (optionally connected to controller 511) may be positioned between the error stage 508 and the frequency modulation stage 510. In another example, the delay block 509b (optionally connected to controller 511) may be positioned between the analysis block 504 and the error block 508. The delay block (509a or 509b, collectively referred to as 509) and/or controller (511) can be configured such that the correction is applied at the appropriate times in the cycle (e.g., at the same or approximately the same position along the rising or falling slopes of the chirped laser signal, as discussed below).

Figure 6C:
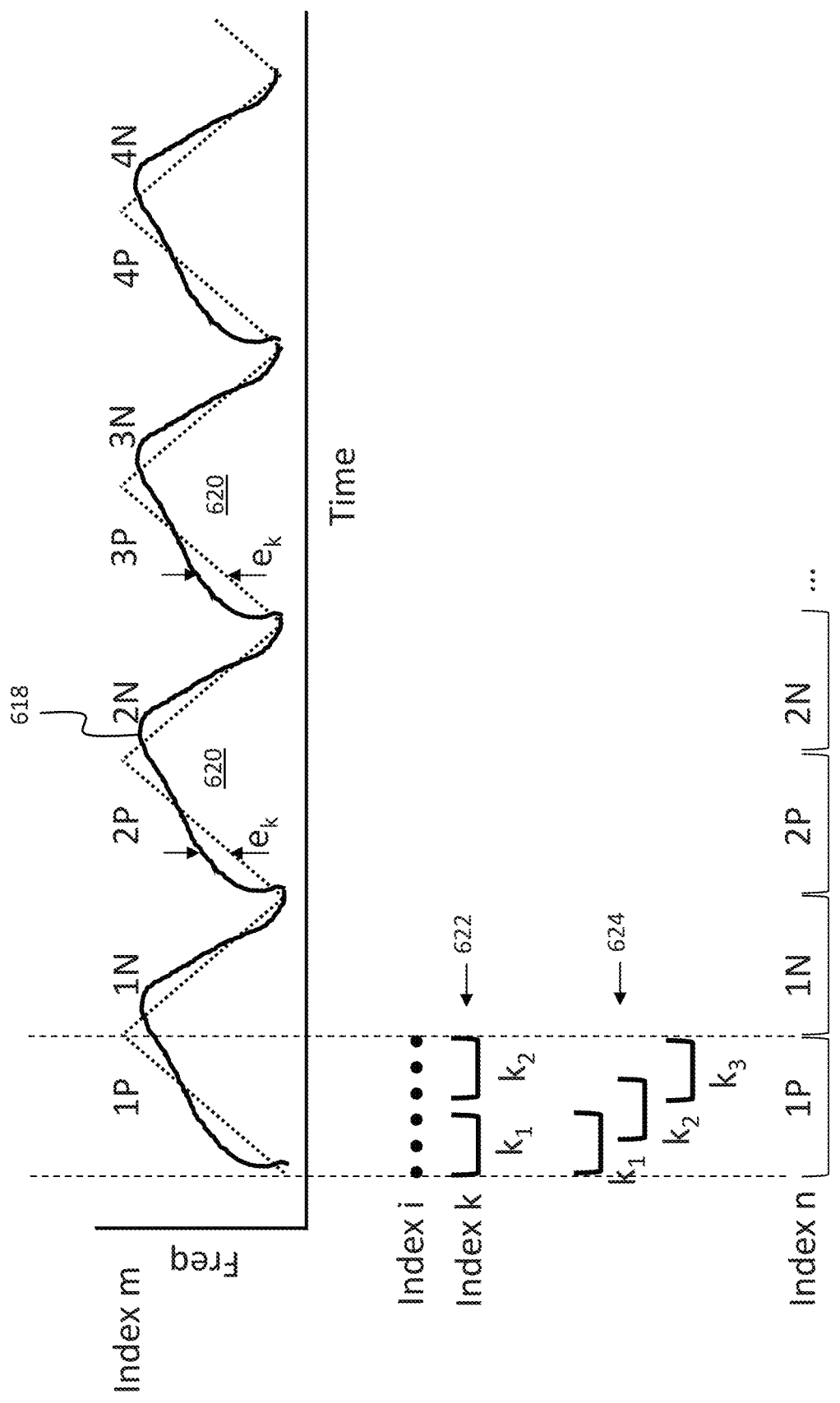
FIG. 6C is plot illustrating the application of error correction to a laser drive signal.

In some implementations, the behavior in the error in each slope of the chirped laser signal is fairly deterministic. For instance, the error in the rising slope of the laser signal is similar to the error in subsequent rising slopes of the laser signal. FIG. 6C illustrates an example laser drive signal 618 that is corrected over one or more cycles. The laser drive signal 618 can be oversampled (refer to index i). These samples can be binned (also referred to as buckets) with index k. Executing DFTs over these bins can produce frequency for each bin k. These bins k may be configured adjacent to one another (refer to bins 622) or overlapping with one another (refer to bins 624).

In some embodiments, the error correction signal can be determined on one or more slopes and applied to one or more future slopes. Therefore, indexing over the slopes with index n, correction to slope n+1, n+2, etc. can be made with information from slopes n, n−1, etc. For example, the error correction signal is determined for slope 1P of the laser drive signal 618 and is applied (with a delay) to slopes 2P, 3P, 4P, etc. In another example, the error correction signal is determined for slopes 1P and 2P and is applied (with a delay) to slopes 3P, 4P, etc. Note that the delay may be imposed by the delay block 509. For example, referring to error $e_k$ for a given sample point on laser drive signal 618, the correction 620 is applied in the same position along parallel slopes (e.g., slopes 2P and 3P). In some embodiments, a controller 511 that is connected to the delay block 509 can be configured to adjust the delay applied to the error correction. The controller 511 may be configured to keep track of the points on the slopes that are being corrected.

In some embodiments, the frequency modulation may be applied to the laser 102 via the laser bias (gain stage) 512. In exemplary system 500b, the correction signal at stage 514 may be provided to a frequency modulation generator 516. The generator 514 may send the corrected modulation signal to modulator 518. In other embodiments, the frequency modulation may be applied via a separate electrode, e.g., a phase modulation electrode of the laser 102. For example, laser 102 may be coupled to a phase modulation electrode to control the phase of light within the cavity the laser 102. Frequency modulation may be based on the phase modulation of the light. In some embodiments, the modulator 518 and splitter 104 may be on the same integrated circuit (IC) (e.g., monolithic chip), may be co-packaged, or on separate ICs.

The exemplary method 400 for linearizing chirp may be performed in a factory (e.g., before deployment) or in situ (e.g., during operation). In some embodiments, this method can be applied to direct frequency modulation of laser 102 or to one or more external modulators (e.g., modulator 518) coupled to laser 102. Note that components or functions 116, 118, 504, 506, 508, and/or 510 may be part of or enabled by one or more processors, one or more computing systems, one or more server systems, etc.

In some embodiments, the exemplary method 400 and/or exemplary system 500 can utilize a reference delayed signal to generate the error signal for correction. As discussed further below, such a reference delayed signal may be obtained using a built-in reference reflection within the LiDAR system (e.g., refer to method 1000 and system 1100), a reflection from the front face of the launching optics (e.g., refer to method 1300 and system 1400), and/or a reflection from the target 110.

Linearization of Chirp Using Two Continuous Wave Lasers

In some embodiments, chirp linearization can be attained with the use of a second laser (e.g., a second continuous wave (CW) laser). The following describes exemplary systems and methods for linearizing chirp in FMCW coherent LiDAR systems with two CW lasers (e.g., one unmodulated CW laser and one FMCW laser).

Figure 7:
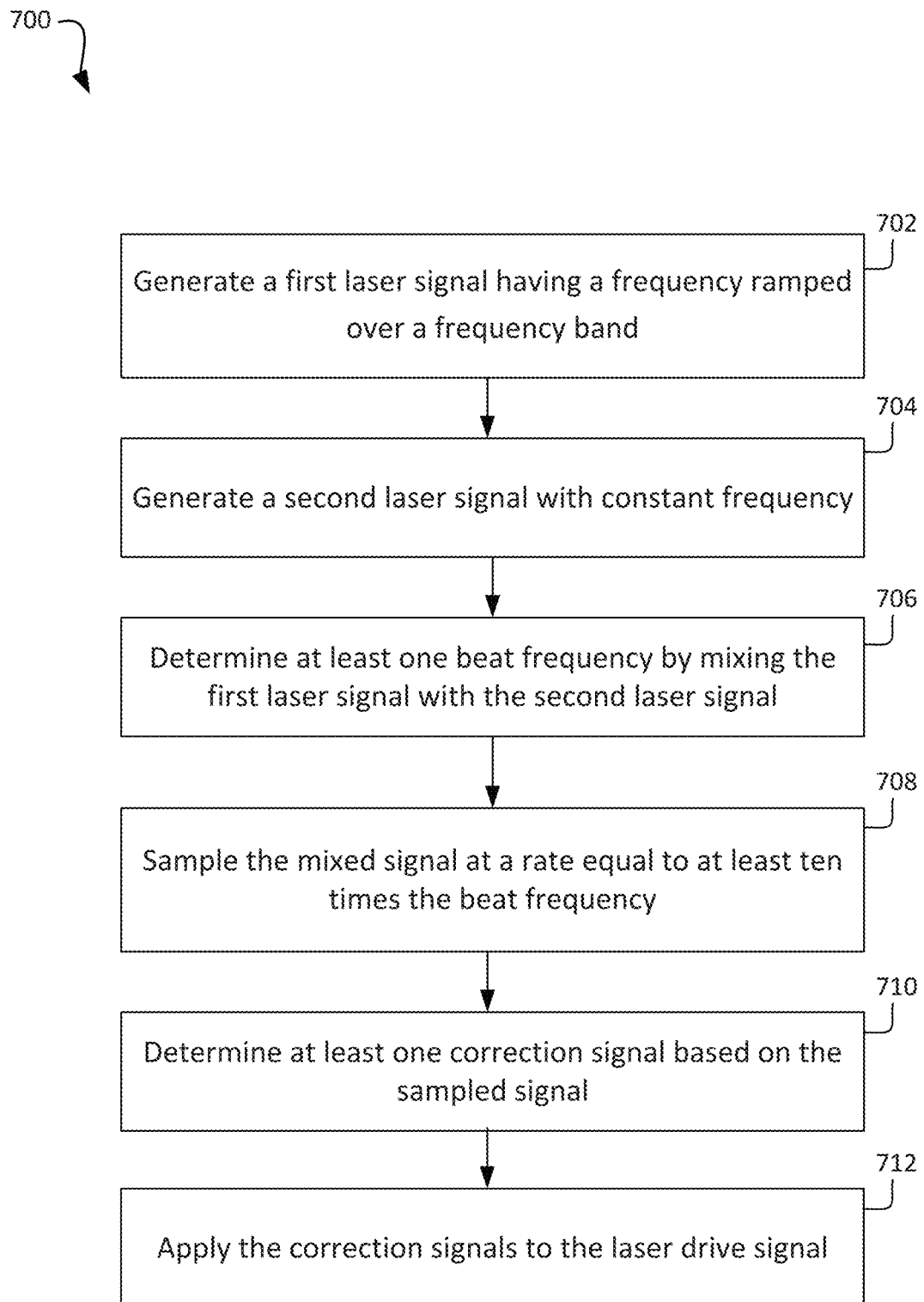
FIG. 7 is a flowchart of an exemplary method for chirp linearization with two CW lasers in FMCW coherent LiDAR systems.
Figure 8A:
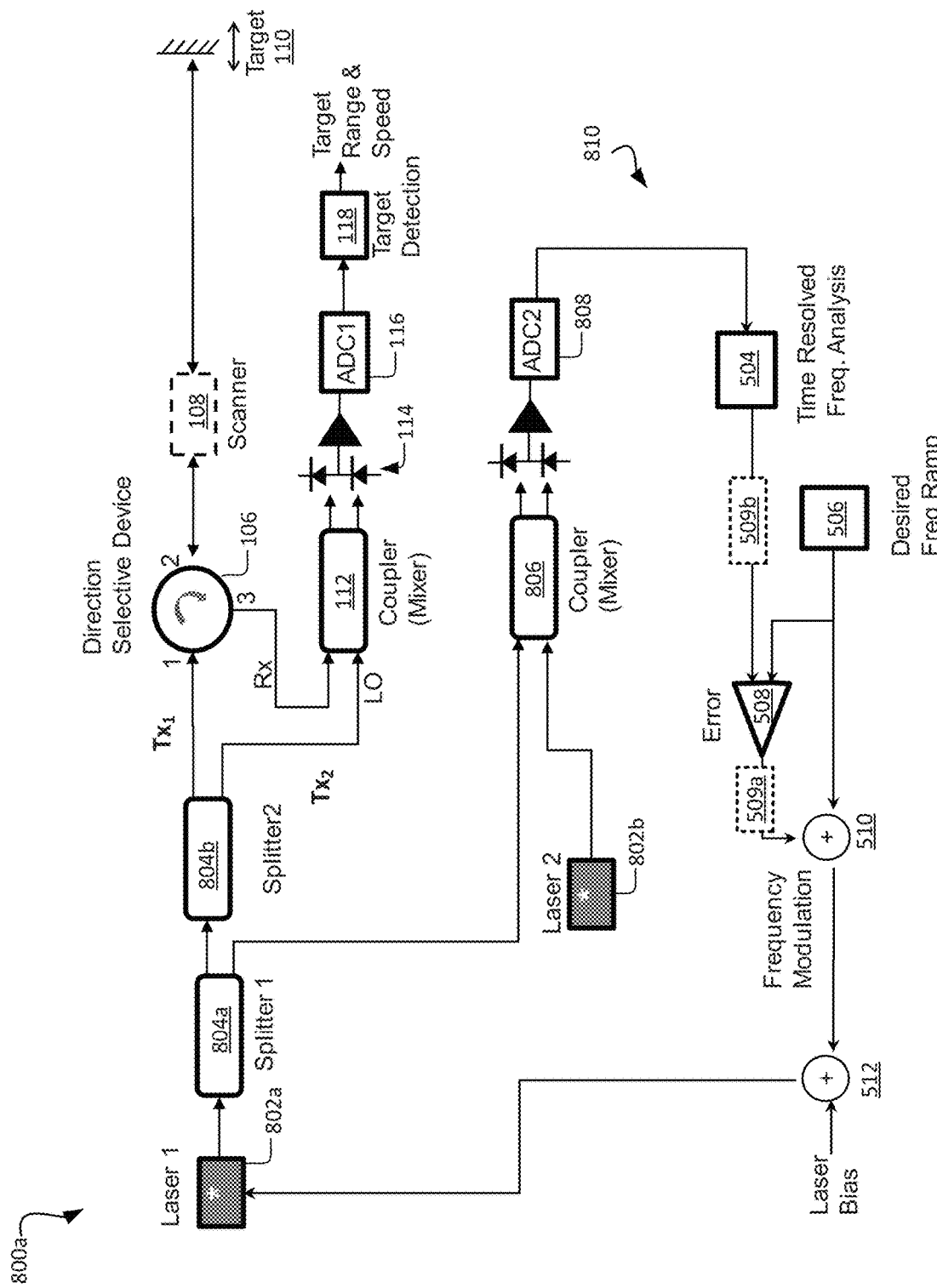
FIGS. 8A-8B are diagrams of embodiments of a coherent LiDAR system configured for chirp linearization via the two CW lasers.
Figure 8B:
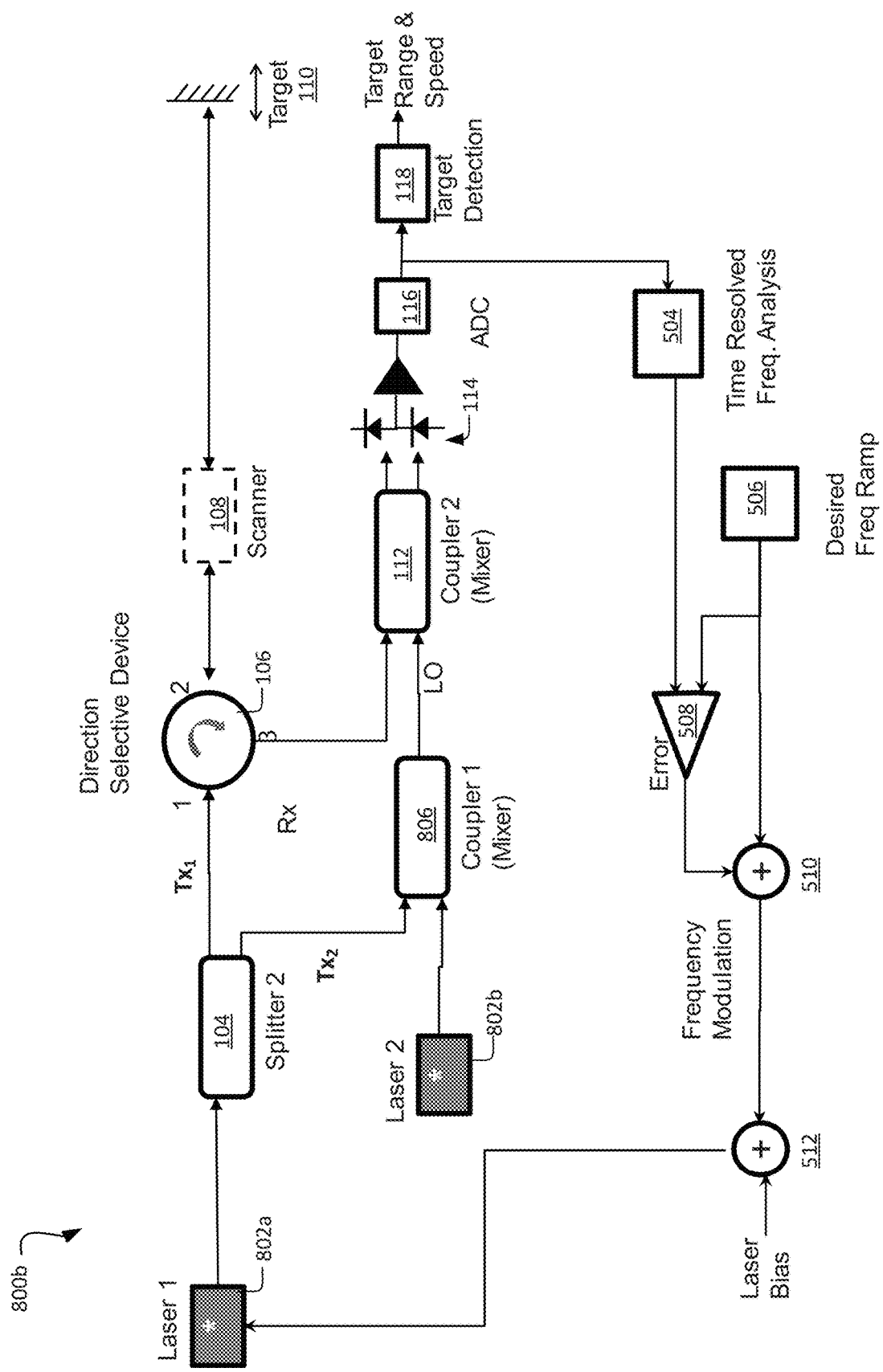

FIG. 7 is a flowchart of an exemplary method 700 for chirp linearization with two CW lasers in FMCW coherent LiDAR systems. FIGS. 8A-8B illustrate two alternative embodiments of a coherent LiDAR system 800a, 800b (collectively referred to as 800) configured for chirp linearization via the two CW lasers. For the sake of clarity and conciseness, FIGS. 7-8B are discussed together below. Note that coherent LiDAR systems 800 may share one or more components and/or configuration similarities with systems 100, 500a, or 500b and, accordingly, discussion of like elements will not be repeated here.

FIG. 8A illustrates a coherent LiDAR system 800a. In step 702 of exemplary method 700, a first laser signal is generated by laser 802a and provided to a splitter 804a. The splitter 804a provides a first chirped laser signal to another splitter 804b for directing to target 110 (as discussed in detail above). Splitter 804a provides a second chirped laser signal (e.g., having the same characteristics of the laser signals $Tx_1$, $Tx_2$). to a mixer 806. In step 704, laser 802b is configured to generate a second laser signal in CW mode. The mixer 806 is configured to receive the second laser signal from laser 802b. In step 706, the chirped laser signal is mixed with the CW laser signal. Accordingly, the output of mixer 806 is used in generating a correction signal for LiDAR system 800a (via path 810). The mixed signal beats at the difference in frequency between two laser signals and is provided to another ADC 808. Note that components or functions 116, 118, 504, 506, 508, 510, and/or 808 may be part of or enabled by one or more processors, one or more computing systems, one or more server systems, etc.

FIG. 8B illustrates an alternative embodiment of LiDAR system 800b. In particular, a single splitter 804a provides a chirped signal to a mixer 806, which mixes the chirped signal with the CW signal from laser 802b. The output of mixer 806 is provided as an LO signal to mixer 112. Note that, in LiDAR system 800b, mixer 112 also receives the reflection signal Rx and is used for target detection (e.g., at stage 118), thereby creating a single channel for both detection and correction. The output of mixer 112 is used to determine the beat frequency and so forth, as described for exemplary system 500a. Note that LiDAR system 800b can be operated in at least the following modes:

Mode 1—Calibration mode. In calibration mode, the target reflection can be blocked. For example, the scanner 108 can be oriented inward and/or away from a location of a target. By being oriented inward, the scanner 108 absorbs the light from the laser 802a. Because no target reflections are received, the system 800b is configured to generate a correction signal to linearize the chirp.

Mode 2—Operational mode. In operational mode, the scanner 108 operates normally to detect target reflections. Laser 802b can be turned off so no correction signals are being generated during Mode 2.

In the above embodiment, LiDAR system 800b may be in Mode 1 before Mode 2 (e.g., before each instance of measuring target range and speed). In some embodiments, LiDAR system 800b may be in Mode 1 for testing after assembly (e.g., at the manufacturing stage, in a factory, etc.). In some embodiments, LiDAR system 800b may be in Mode 1 at the starting of and/or powering up of LiDAR system 800b. In some embodiments, LiDAR system 800b may switch between Mode 1 and Mode 2 (e.g., at predetermined intervals). For example, system 800b may switch between Modes 1 and 2 every second, every 5 seconds, every 10 seconds, every 30 seconds, every minute, etc. In some embodiments, LiDAR system 800b may enter Mode 1 upon a trigger, e.g., based on the system temperature (e.g., when the temperature changes by more than 1 degree, 2 degrees, 3 degrees, 5 degrees, etc.) or on a change in power level of the system 800b.

It is understood that other variations of systems 800a, 800b can be implemented to achieve linear chirp. For example, splitters 804a and 804b of system 800a can be combined into a single splitter. In another example, for a multi-channel laser (e.g., at laser 802a) in which multiple spatial channels are realized by splitting the output of laser 802a, a single CW laser 802b can be employed. In another example, laser 802a and laser 802b may be part of a single laser device (e.g., having two channels).

Figure 9:
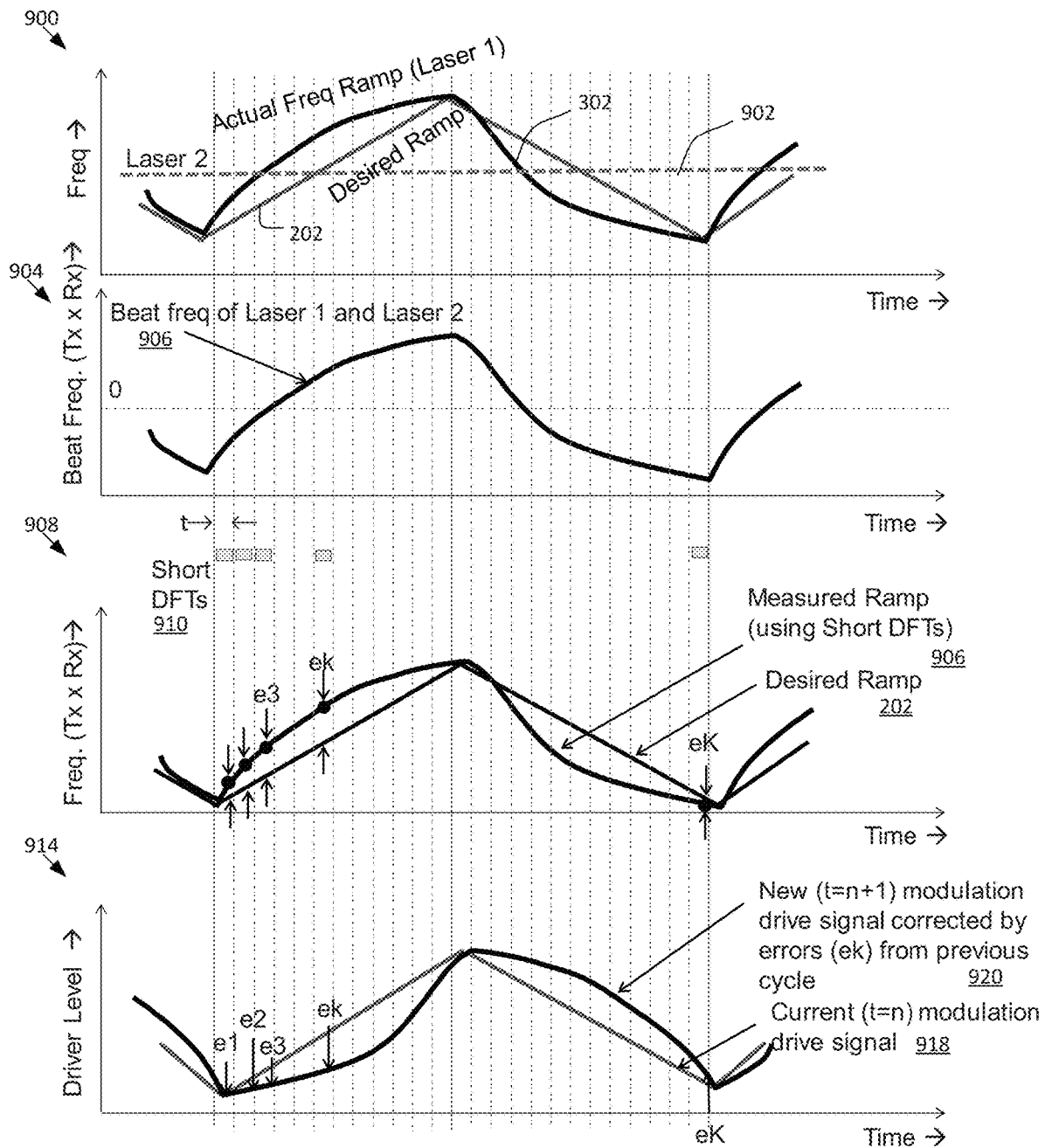
FIG. 9 are plots depicting the processing of laser signals from lasers according to exemplary method of FIG. 7.

FIG. 9 illustrates the processing of laser signals from lasers 802a, 802b according to exemplary method 700. Plot 900 illustrates the actual frequency 302 of laser 802a and constant frequency 902 of laser 802b. Plot 904 illustrates the beat frequency 906 of mixed signals from laser 802a and laser 802b. Note that beat frequency of mixed signal 906 is a time-shifted version of actual frequency 302 (e.g., by the frequency of CW laser 802b).

This beat frequency may be determined by time-resolved frequency measurements via DFTs (e.g., at time-resolved frequency analysis stage 504). To execute the time-resolved DFTs, in step 708, the mixed signal can be oversampled (as described in detail above). Referring to FIG. 9, short DFTs 910 in plot 908 are illustrated with respect to time increments t. In some embodiments, DFTs can be executed on disjoint data blocks back-to-back, on adjacent data blocks, and/or on overlapping data blocks to attain greater resolution (e.g., a greater number of correction points per time window). Example DFTs 910 are depicted as adjacent but disjoint data blocks. In some embodiments, the DFTs 910 may be sliding DFTs with overlap, resulting in more correction points and a smoother drive signal for the laser 802a.

In step 710, one or more error signals e1, e2, ek (correction signals) can be determined by comparing measured beat frequency 906 with desired linear chirp 202. In some embodiments, a linear fit is used on the measured beat frequency (e.g., a linear fit for the positive slope and another fit for negative slope). The error from desired slope 202 is determined as function of location on the frequency slope. In some embodiments, the frequency of the second CW laser signal 802b is used as the reference signal. The absolute value of the deviation from the reference signal may be used to determine the error in the chirped laser signal. For example, the chirped laser signal 802a varies in frequency between 190-191 THz and the CW laser signal 802b has a constant frequency at 100 THz. In an example where the measured frequency is 190.0008 THz, the error correction would be the absolute value of the difference 190 THz−190.0008 THz=0.0002 THz.

At step 712, these error signals at stage 508 can be used to correct the frequency modulation control at stage 510 to drive laser 802a. In plot 914, the error signals e1, e2, ek are applied to a modulation signal 916 to form a corrected modulation signal 918. In some embodiments, the modulation drive signal to control the chirp of laser 802a is determined and/or updated according to the following relationship:

modulation drive[k,t=n+1]=modulation drive[k,t=n]+ μ*error[k,t=n]

where k is the index for location on the ramp, n is time ramp index, and μ is the feedback loop gain. The feedback loop gain can be used to determine how aggressively the correction is applied to the laser drive signal. For instance, a higher value of μ causes faster convergence but has a larger fluctuation around the final value. Conversely, a lower value of μ causes slower convergence but has a smaller fluctuation around the final value.

This feedback correction can be executed repeatedly to minimize the error and/or track near the minimum error. For example, this correction can be executed repeatedly, continuously, periodically, or intermittently in a feedback loop during live operation in field (in situ) and/or executed as a separate calibration procedure at start-up of the LiDAR system. For example, the feedback loop can be executed every cycle or after every N number of cycles (e.g., to save power and/or process time) in situ. In some embodiments, the correction signal can be applied to direct frequency modulation of laser 802a or to one or more external modulators. The method 700 may incorporate oversampling, e.g., as described in method 400.

Linearization of Chirp Using Partial Field-of-View (FOV) as Reference Reflector

In some embodiments, chirp linearization can be attained with the use of a reference reflector. In some cases, the reference reflector can be the scanner's partial FOV. The following describes exemplary systems and methods for linearizing chirp in FMCW coherent LiDAR systems using the partial FOV as the reference reflector.

Figure 10:
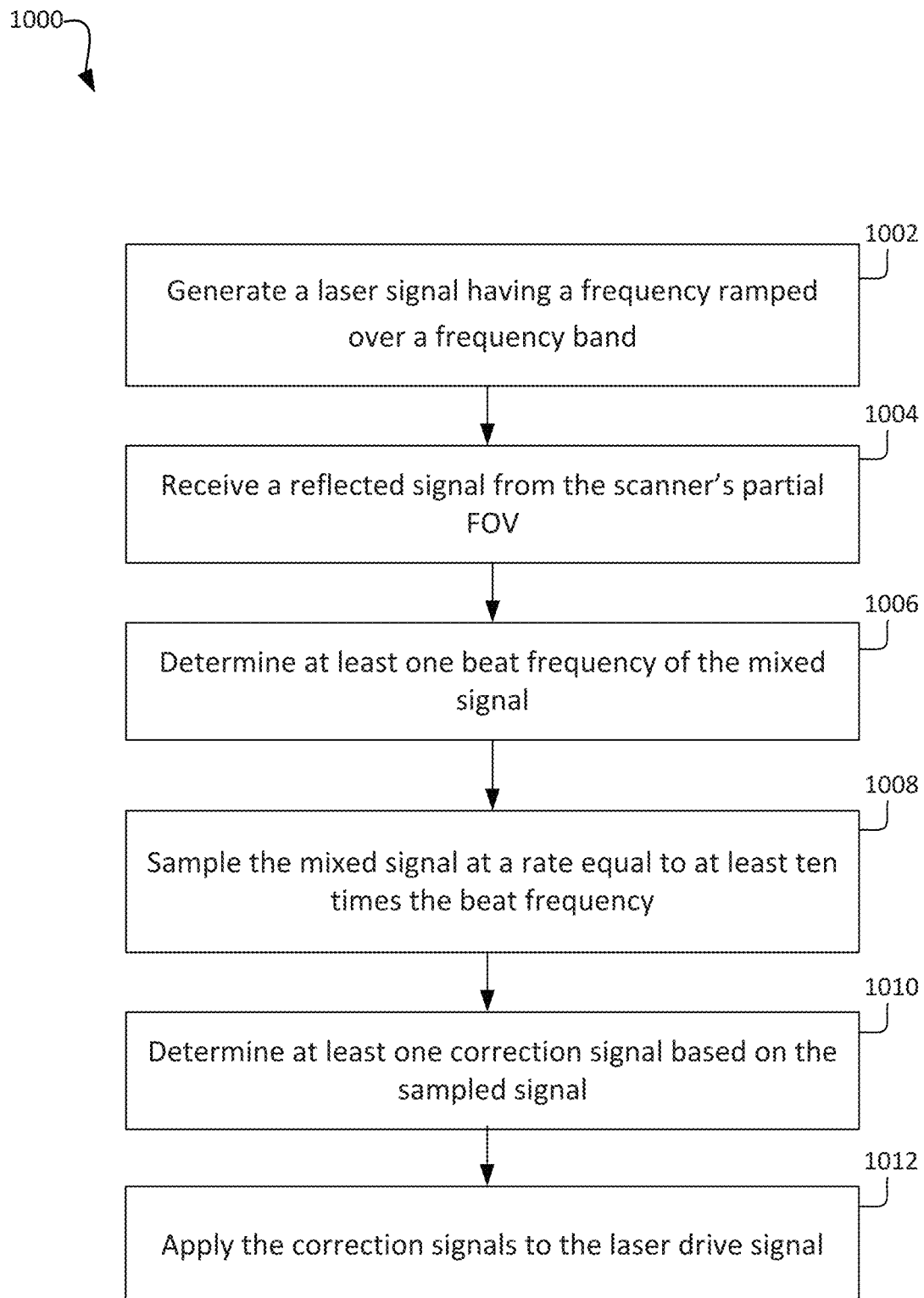
FIG. 10 is a flowchart of an exemplary method for chirp linearization using the partial FOV as the reference reflector in FMCW coherent LiDAR systems.
Figure 11:
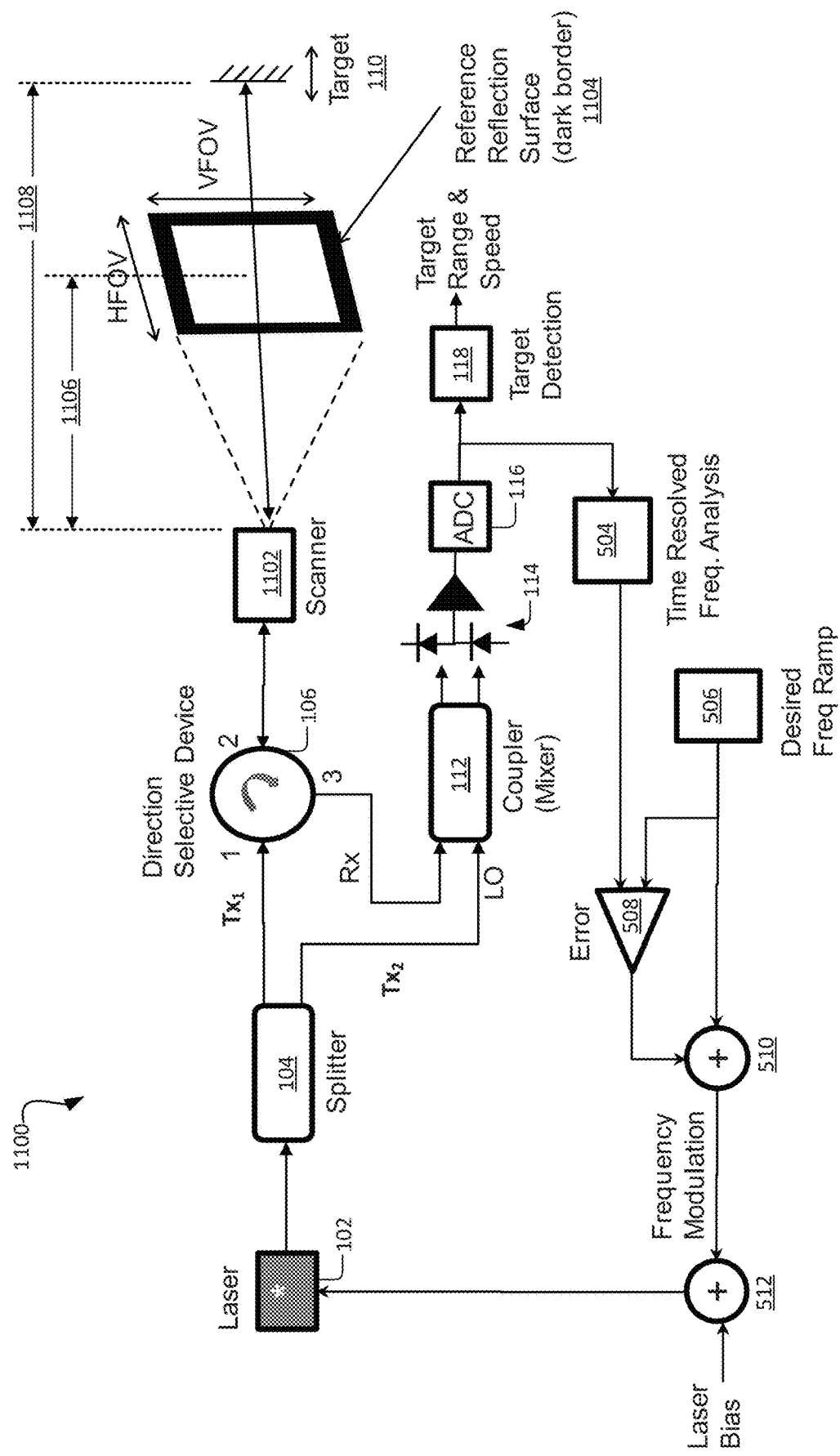
FIG. 11 is an embodiment of a coherent LiDAR system configured for chirp linearization via the partial field-of-view (FOV) reference reflector.

FIG. 10 is a flowchart of an exemplary method 1000 for chirp linearization using the partial FOV as the reference reflector in FMCW coherent LiDAR systems. FIG. 11 illustrates an embodiment of a coherent LiDAR system 1100 configured for chirp linearization via the partial FOV reference reflector. For the sake of clarity and conciseness, FIGS. 10-11 are discussed together below. Note that coherent LiDAR system 1100 may share one or more components and/or configuration similarities with systems 100, 500a, 500b, 800a, or 800b and, accordingly, discussion of like elements will not be repeated here.

In step 1002 of exemplary method 1000, the laser signal Tx is generated by laser 102. The laser signal Tx has a frequency that is chirped (e.g., ramped up, ramped down, etc.). In step 1004, a reflected signal of the target is received by the scanner 1102. In this embodiment, a portion of the total FOV of the scanner 1102 can be allocated to attain a reference reflection from surface 1104. During an FOV scan, the scanner 1102 can direct the light beam to this region 1104 and receive a reference reflection signal.

Figure 12A:
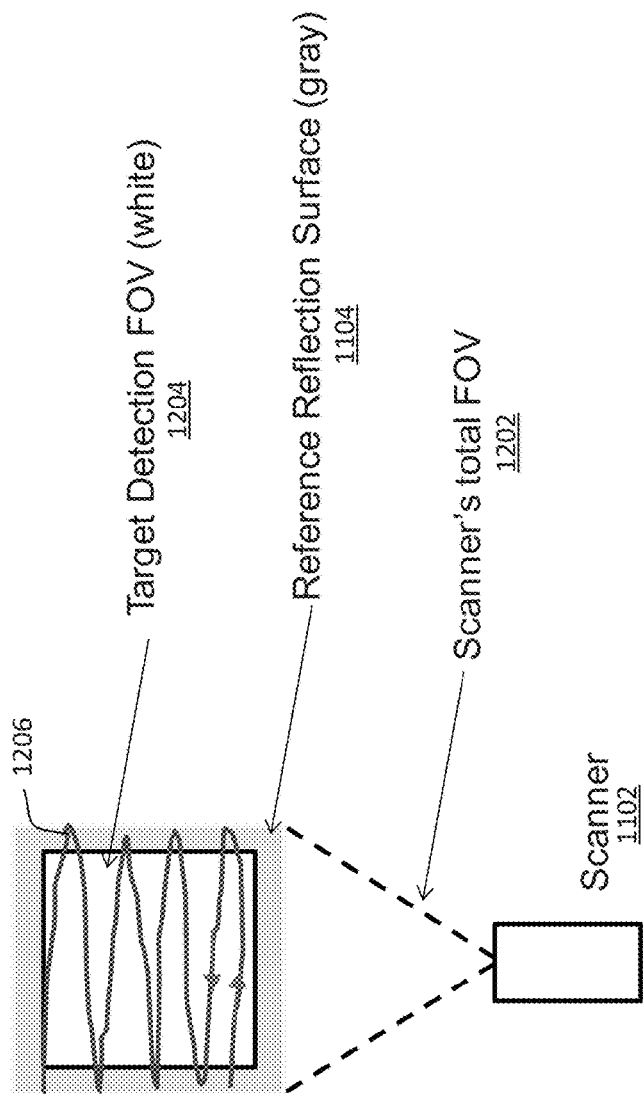
FIG. 12A is a diagram of the scanner total FOV including the target detection FOV and the reference reflection surface.

Referring to FIG. 12A, the total FOV 1202 of scanner 1102 includes the target detection FOV 1204 (which is used to detect targets 110) and the reference reflection surface 1104. In some embodiments, the reference reflection surface 1104 can be semitransparent. A semitransparent reflection surface can reflect a portion of the incident light beam and enable transmission of another portion (e.g., the rest of) the light beam. If the transmitted light beam reflects off of the target and returns to receiver optic (e.g., of scanner 1102), two beat frequencies can be created. A lower beat frequency can be at a deterministic frequency based on the distance 1106 from the transmitter optic to the reference reflection surface 1104 (e.g., due to the shorter distance between the scanner 1102 and surface 1104). In some embodiments, the reference reflection surface 1104 is in the same enclosure are the scanner 1102. In some embodiments, an optical fiber may be used to build in greater distance between the scanner 1102 and surface 1104. The higher beat frequency can be based on the distance 1108 of the transmitter optic (e.g., of scanner 1102) to the target 110 (e.g., due to the longer distance between the scanner 1102 and target 110). Note that other shapes (e.g., circular, checkered, triangular, etc.) for the reference reflection surface 1104 are within the scope of this disclosure. The scanner 1102 can scan with example pattern 1206, which can overlap both the target detection FOV 1204 and reference reflection surface 1104. Note that other scan patterns (e.g., spiral shape scan, vertical scan, etc.) are within the scope of this disclosure. In some embodiments, the light can be directed in a time-interleaved manner.

Figure 12B:
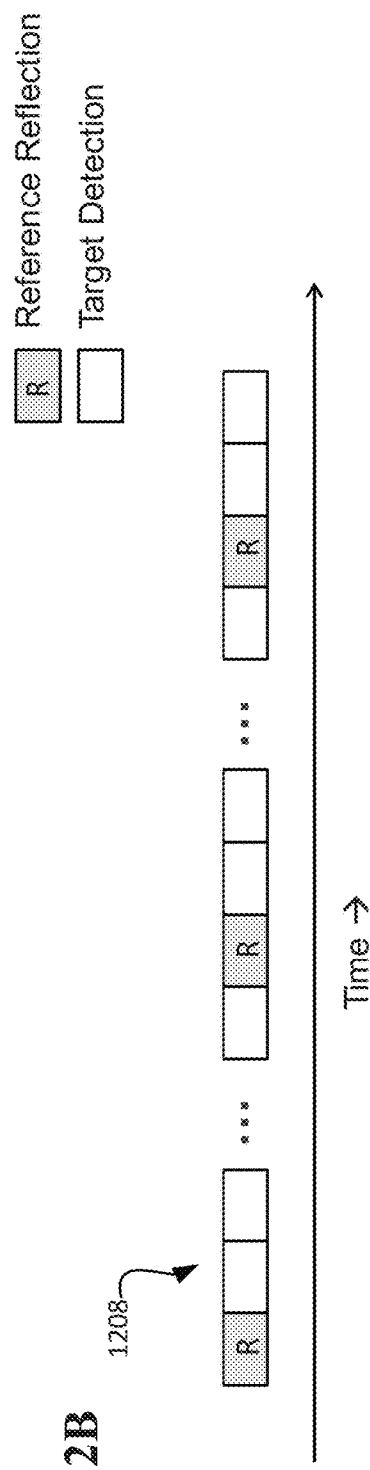
FIG. 12B is a diagram illustrating the interleaving of reference reflection with target reflection during an example scan.

Using this reference reflection signal, the exemplary system 1100 can perform error calculation and correct the modulation signal to linearize the chirp, as described further below. In some embodiments, the linearization determination is initialized and/or integrated when the scanner pattern 1206 passes over the reference reflection surface 1104. In particular, the error calculation for chirp linearization can be interleaved as part of the scan 1208. FIG. 12B illustrates the interleaving of reference reflection with target reflection during an example scan 1208. In particular, the instances of reference reflection (denoted by 'R' in a gray box) is interspersed with the instances of target detection (denoted by a white box).

The reflected signal is provided to the mixer 112 with an LO signal. In step 1006, the mixed signal is used by the ADC 116 to determine one or more beat frequencies in the return signal. In particular, the processing unit 118 can execute one or more DFTs to determine the beat frequencies according to the time-resolved frequency determination technique discussed above. In some embodiments, the short sliding DFTs can be used. In step 1008, to execute the time-resolved DFTs, the mixed signal can be oversampled (as described in detail above).

In step 1010, one or more error signals (also referred to as correction signals) can be determined, as described in greater detail above. At step 1012, these error signals at stage 508 can be used to correct the frequency modulation control at stage 510 to drive laser 802*a*.

In some embodiments, the method 1000 can be used to linearize the chirp of laser 102 and/or used by the external modulator to linearize chirp. The method 1000 may incorporate oversampling, e.g., as described in method 400. The method 1000 may be used during operation (in situ).

Linearization of Chirp Using Reflected Signals from Partial Reflector

In some embodiments, chirp linearization can be attained with the use of a reference reflector, which may include a partial reflector, e.g., the inline facet of a beam-forming optical device of the LiDAR system. The following describes exemplary systems and methods for linearizing chirp in FMCW coherent LiDAR systems using the partial reflector as the reference reflector.

Figure 13:
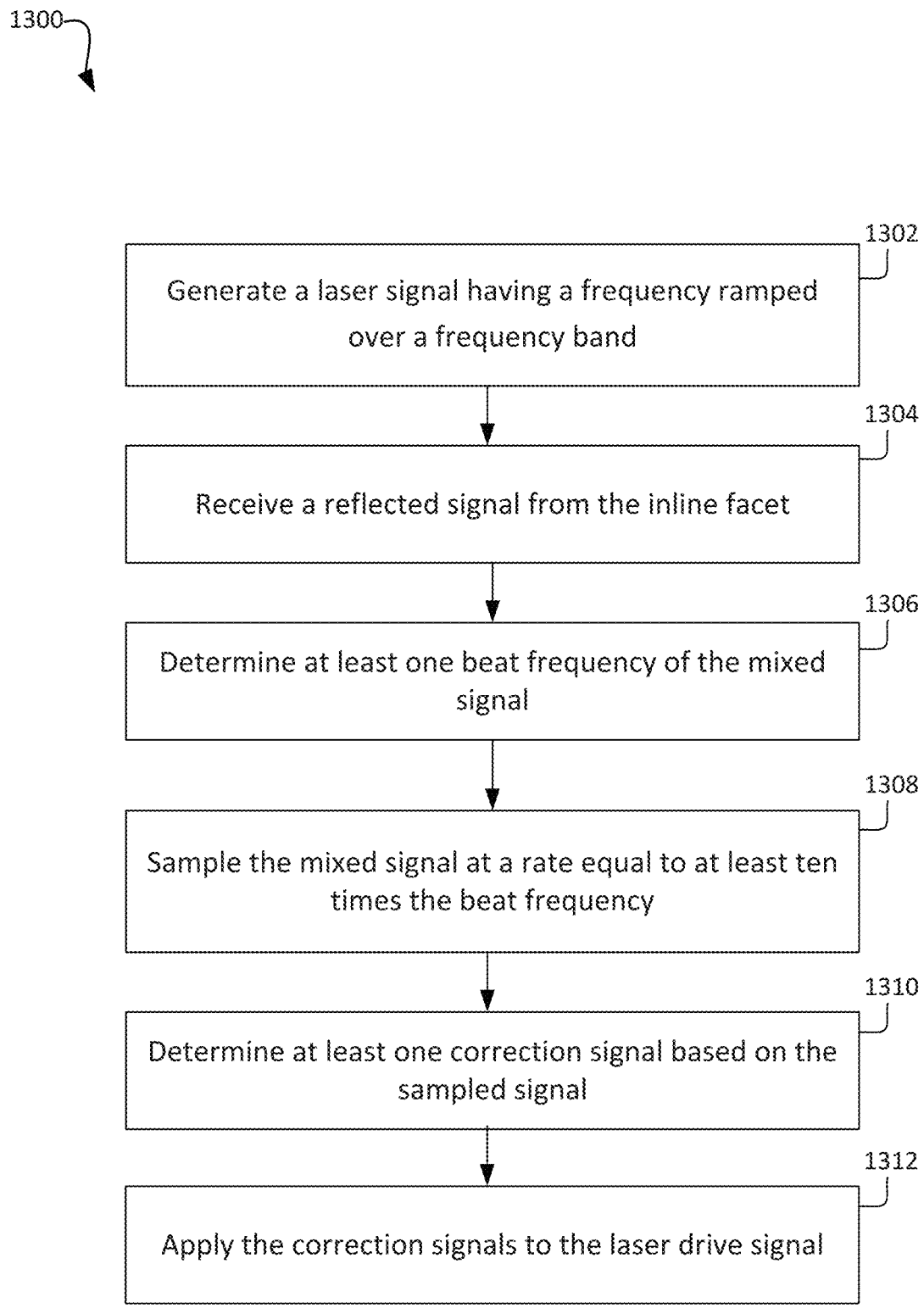
FIG. 13 is a flowchart of an exemplary method for chirp linearization using the inline partial reflector as reference reflector in FMCW coherent LiDAR systems.
Figure 14A:
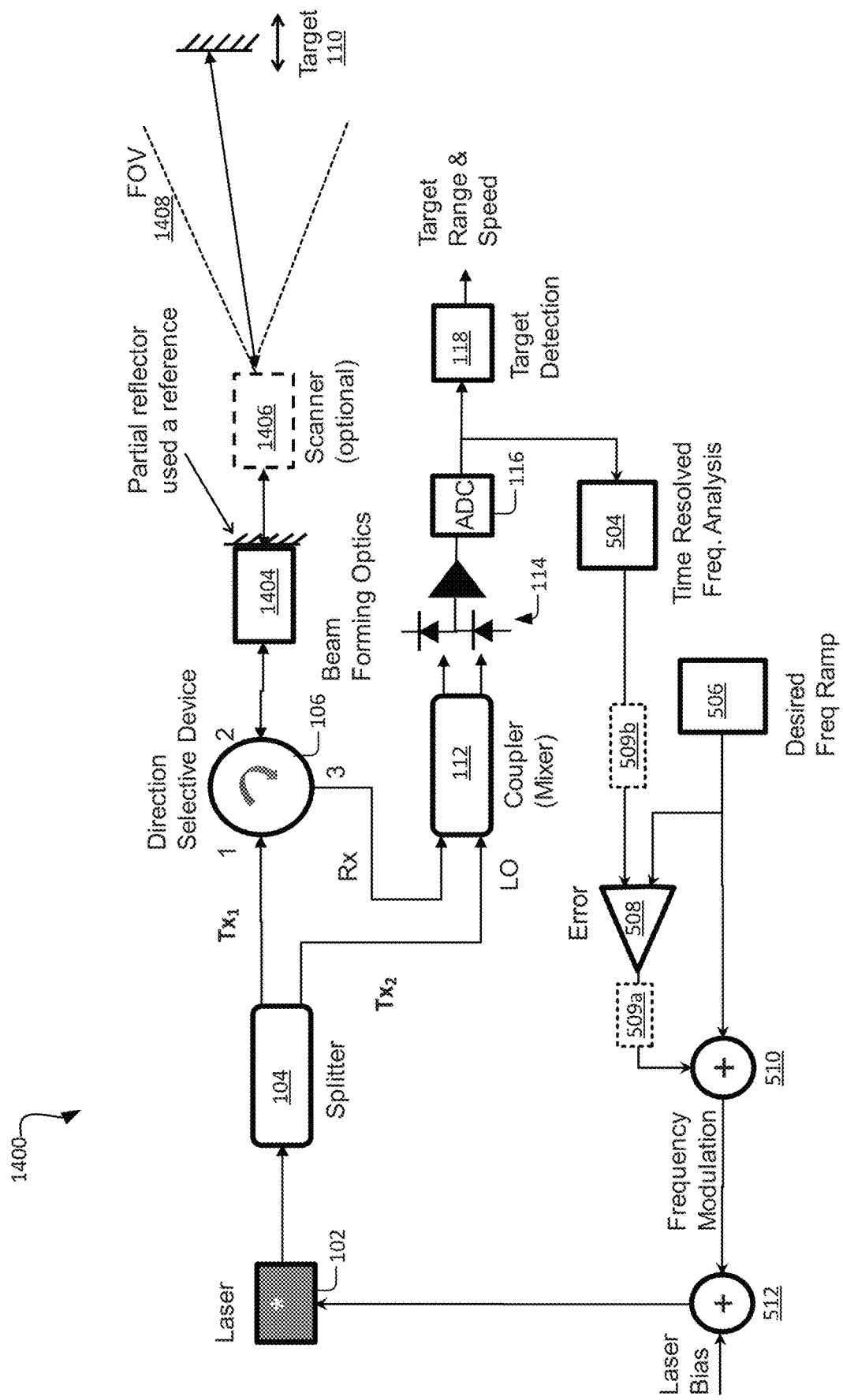
FIG. 14A is a diagram of an embodiment of a coherent LiDAR system configured for chirp linearization via partial reflector.

FIG. 13 is a flowchart of an exemplary method 1300 for chirp linearization using the partial reflector as reference reflector in FMCW coherent LiDAR systems. FIG. 14 illustrates an embodiment of a coherent LiDAR system 1400 configured for chirp linearization via partial reflector as reference reflector. For the sake of clarity and conciseness, FIGS. 13-14 are discussed together below. Note that exemplary LiDAR system 1400 may share one or more components and/or configuration similarities with systems 100, 500*a*, 500*b*, 800*a*, 800*b*, or 1100 and, accordingly, discussion of like elements will not be repeated here.

In step 1302 of exemplary method 1000, the laser signal Tx is generated by laser 102. The laser signal Tx has a frequency that varies (e.g., ramped up, ramped down, chirped, etc.). In step 1304, a beam forming optical device 1404 (also referred to as launching optics) is used to form the light for projecting onto a target 110. The beam forming optical device 1404 may include a partial reflector to be used a reference. In particular, the inline optical facet or the front facet of the optical device 1404 can be employed to provide the reference reflection. The lens interface is partially reflecting due to dielectric change when transiting to free space. This reflection may be sufficient to provide the reflection needed to provide the reference signal.

The reflection from the partial reflector (e.g., the inline optical facet of optical device 1404) can be used to determine (e.g., derive, calculate, etc.) a reference signal used to correct the frequency modulation signal in chirp linearization. Optionally, the device 1404 may be coupled to a scanner 1406 with FOV 1408. During operation (or offline), the optical device 1404 and/or scanner 1102 can direct the light beam to the target 110 and receive a reference reflection signal. Using this reference reflection signal, the exemplary system 1100 can perform error calculation and correct the modulation signal to linearize the chirp, as described further below.

Figure 15A:
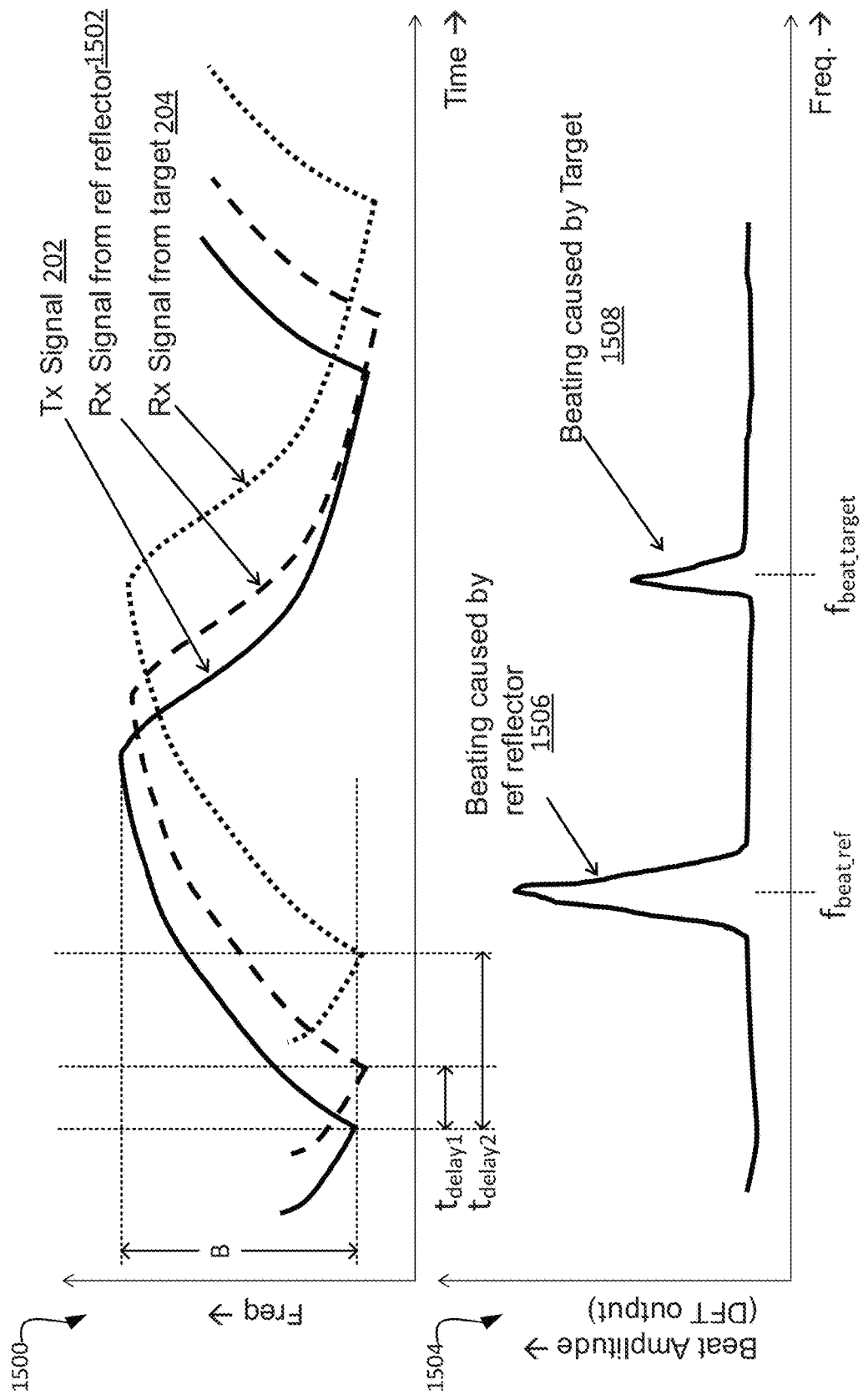
FIGS. 15A-15B are plots providing the respective frequencies of laser signal, reference reflector signal, and the target reflected signal from the target as a function of time.

Referring to FIG. 15A, plot 1500 provides the respective frequencies of laser signal Tx 202 (solid line), reference reflector signal 1502 (dashed line), and the reflected signal 204 from the target 110 (e.g., a stationary target) as a function of time. Note that the reference reflector signal 1502 is delayed in time from the laser signal 202 with time $t_{delay1}$ and the target reflected signal 204 is delayed in time from the laser signal 202 with time $t_{delay2}$. Plot 1504 provides the beat amplitude (of the DFT outputs) as a function of frequency. In particular, the beating 1506 caused by the reference reflector of optical device 1404 is at a lower frequency $f_{beat\_ref}$ than the beating 1508 frequency $f_{beat\_target}$ caused by the target 110. This is because the reference reflector is closer to laser 102 than the target 110, therefore causing the chirp waveform to have less time delay. Note that DFT can clearly separate the beating frequency $f_{beat\_ref}$ caused by reference reflector signal 1502 from beating frequency $f_{beat\_target}$ caused by target(s) as they are at different frequencies. Using the illustrations of plots 1500 and 1504, the relationships of chirp, range, and velocity are defined as described in the following.

Figure 15B:
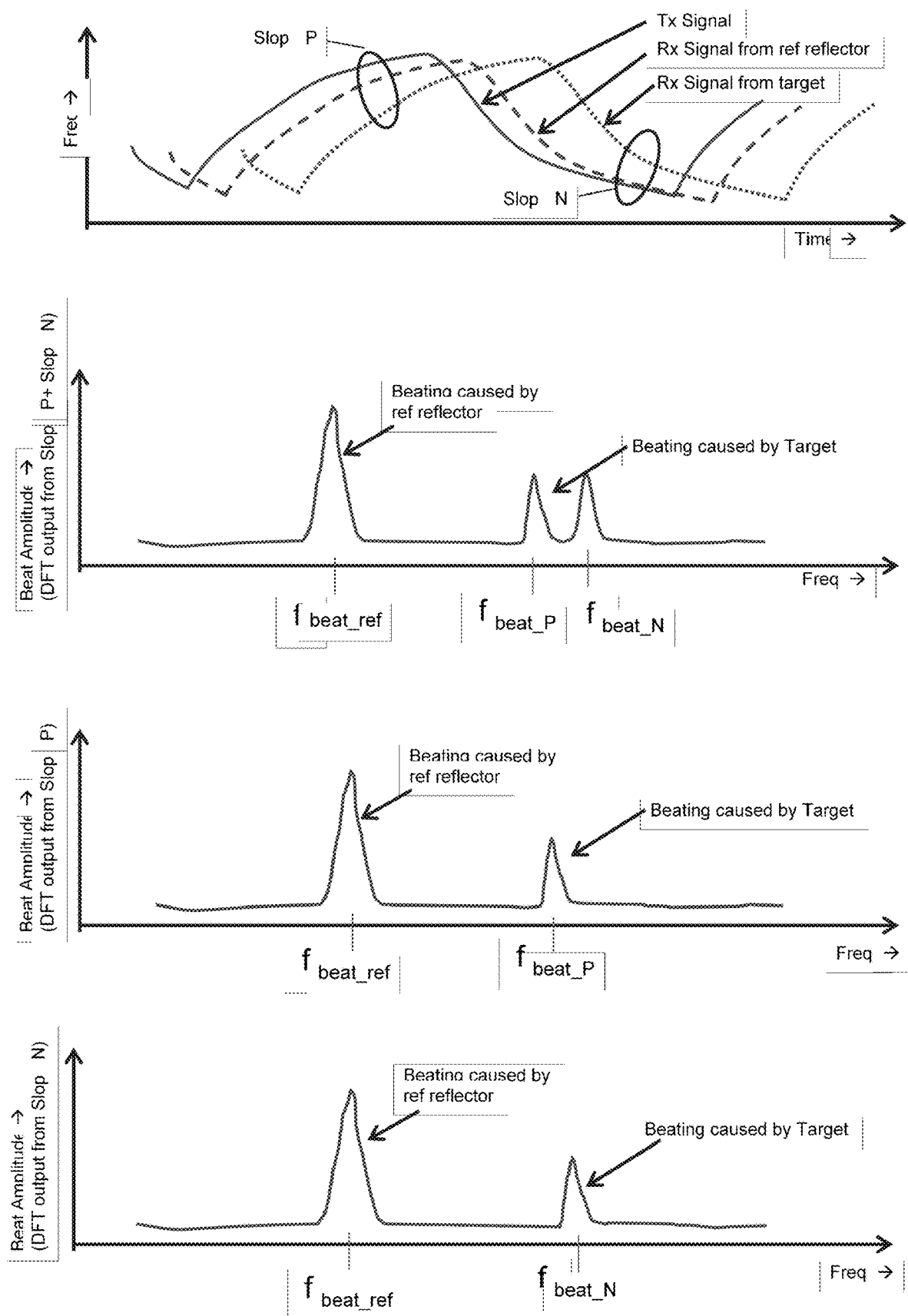

As shown in FIG. 15B, on the positive (P) and negative (N) ramps (also referred to as "Slope-P" and "Slope-N", respectively), beating occurs due to a reference reflector and a target (e.g., a moving target). Because the range (location) information about reference reflector is known, this information is used to determine ideal beat frequency associated with the reference reflector. This beat frequency associated with reference reflector can be used as the expected frequency to determine the error for the drive for frequency modulation of the laser. (Beat frequency related to the reference reflector can be separated from target-related beat frequency as DFT by its very nature separates the frequencies present in its input).

Range of Reference Reflector:

$$R\_ref\_relector = \frac{cT_{ChirpRamp}}{2BW} \cdot \left(\frac{f_{beat\_P} + f_{beat\_N}}{2}\right)$$

Velocity of Reference Reflector:

$$V\_ref\_reflector = \frac{\lambda}{2} \cdot \left(\frac{f_{beat\_P} - f_{beat\_N}}{2}\right)$$

Note that range and velocity of the reference reflector provided above are with respect to the laser and detector system in the LiDAR system.

In various embodiments, the reference reflector is stationary and at a known location with respect to the laser and detector system. Because the reference reflector is stationary with respect to the laser and detection system, beat frequencies caused by the reference reflector on positive and negative ramps are equal, $f_{beat\_P} = f_{beat\_N}$. In the following, this beat frequency is referred to as $f_{beat\_ref}$.

Range for Reference Reflector:

$$R\_ref\_relector = \frac{cT_{ChirpRamp}}{2BW} \cdot f_{beat\_ref}$$

Beat Frequency Related to the Reference Reflector:

$$f_{beat\_ref} = \frac{2BW}{cT_{ChirpRamp}} \cdot R\_ref\_relector$$

This beat frequency associated with reference reflector $f_{beat\_ref}$ can be used as expected frequency to calculate frequency error ($e_k$).

Figure 16A:
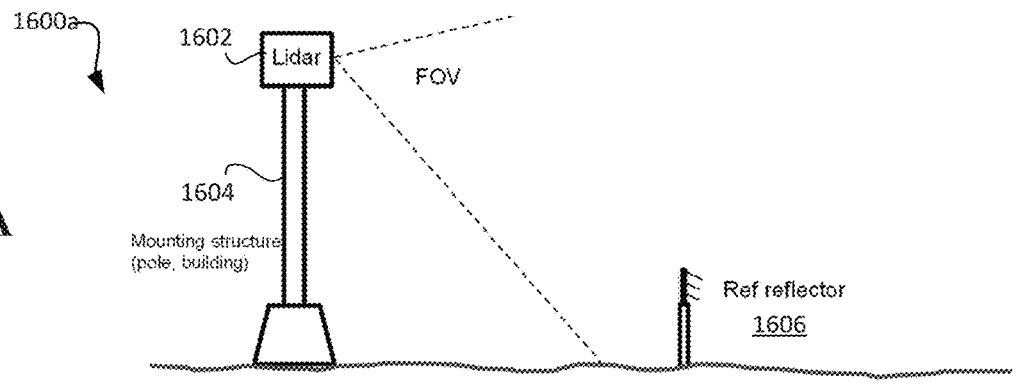
FIGS. 16A-16B are diagrams of various examples of externally positioned reference reflectors relative to a LiDAR system.
Figure 16B:
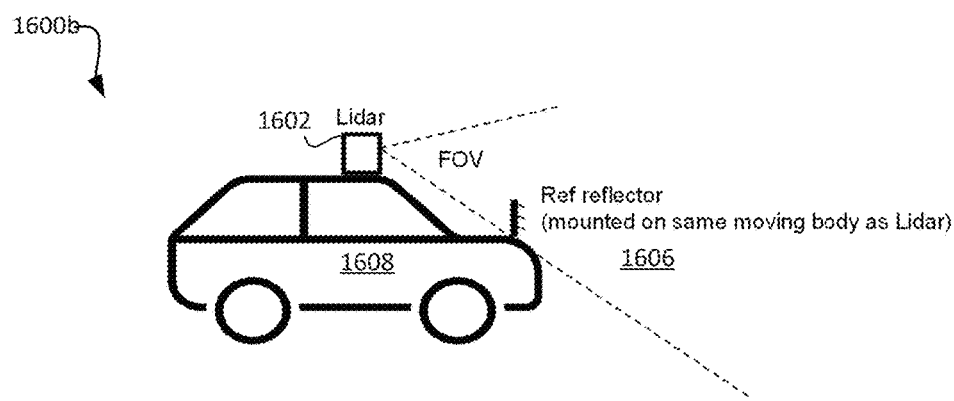

The reference reflector can be within the LiDAR enclosure (e.g., housing) or it may be positioned externally to the LiDAR enclosure. Note that, if an external reflector is used, it may be stationary with respect to the LiDAR system if the LiDAR system is itself stationary. FIGS. 16A-16B illustrate various examples of externally positioned reference reflectors. For example, in FIG. 16A, the LiDAR system 1602 may be installed on a post or building 1604 and the reference reflector 1606 is positioned externally some distance away from the LiDAR system 1602. In FIG. 16B, the reference reflector 1606 may be mounted to same chassis as the LiDAR system 1602 (e.g., on the body of the vehicle 1608 on which LiDAR system 1602 is mounted).

Figure 17:
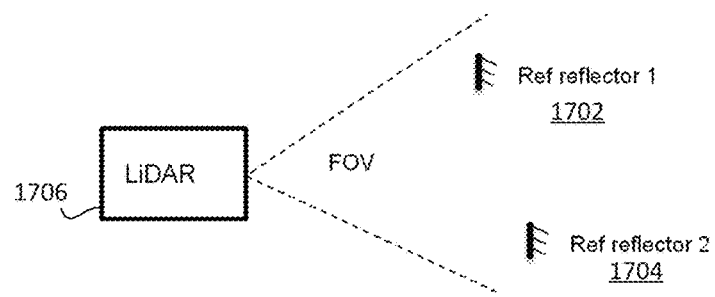
FIG. 17 is a diagram of an example of two reference reflectors positioned at two respective locations relative to the LiDAR system.

In some embodiments, there may be more than one reference reflector that is used in the systems and methods described herein. If multiple reference reflectors (e.g., placed at different distances or the same distance away from the LiDAR system) are used, then error signal $e_k$ can be an average or weighted sum of error $e_k$ calculated using each reference reflector. FIG. 17 illustrates an example of two reference reflectors 1702 and 1704 positioned at two respective locations relative to the LiDAR system 1706.

The range and velocity for the target are determined using the relationships outlined above and provided here:

$$\text{Range: } R_{target} = \frac{cT_{ChirpRamp}\frac{(f_{beat\_P} + f_{beat\_N})}{2}}{2BW}$$

$$\text{Velocity: } V_{target} = \frac{\lambda \frac{(f_{beat\_P} - f_{beat\_N})}{2}}{2}$$

In some embodiments, the correction to the drive signal is determined by calculating the error in the comparison of the beating frequency 1506 caused by reference reflector to its expected value. The expected value for beat frequency $f_{beat\_ref}$ 1506 may be obtained: (i) based on the location of the reference reflector in optics 1404 and/or (ii) based on the average value (e.g., value 608) in the measurement period (e.g., time window Tw1 or Tw2).

The reflected signal is provided to the mixer 112 with an LO signal, resulting in a beat frequency. In step 1306, the mixed signal is used by the ADC 116 to determine one or more beat frequencies in the return signal. In particular, the processing unit 118 can execute one or more DFTs on the sampled signal from ADC 116 to determine the beat frequencies. In some embodiments, the short sliding DFTs can be used. In step 1308, to execute the time-resolved DFTs, the mixed signal can be oversampled (as described in detail above).

In step 1310, one or more error signals (also referred to as correction signals) can be determined, as described in greater detail above. At step 1312, these error signals at stage 508 can be used (e.g., in a feedback loop) to correct the frequency modulation control at stage 510 to drive laser 802a. In some embodiments, the correction loop can be continuously, intermittently, and/or periodically operated to minimize the error in the laser chirp.

In some embodiments, the method 1300 can be used to linearize the chirp of laser 102 and/or used by the external modulator to linearize chirp. The method 1300 may incorporate oversampling, e.g., as described in method 400. The method 1300 may be used during operation (in situ) or offline (not in use). For instance, system 1400 can operate in at least the following modes:

Mode 1—Calibration (offline state). LiDAR system 1400 can use reference reflector of optics 1404 to calibrate (e.g., generate correction signals). In this mode, the system 1400 is not measuring the range or speed of target 110.

Mode 2—Operational (in situ). LiDAR system 1400 can interleave the use of the reference reflector with the scanning of FOV 1408 (at target 110).

In the above embodiment, the system LiDAR system 1400 may be in Mode 1 before Mode 2 (e.g., before each instance of measuring target range and speed). In some embodiments, LiDAR system 1400 may be in Mode 1 for testing after assembly (e.g., at the manufacturing stage, in a factory, etc.). In some embodiments, LiDAR system 1400 may be in Mode 1 at the starting of and/or powering up of LiDAR system 1400. In some embodiments, LiDAR system 1400 may enter Mode 1 upon a trigger, e.g., based on the system temperature (e.g., when the temperature changes by more than 1 degree, 2 degrees, 3 degrees, 5 degrees, etc.) or on a change in power level of the system 1400.

Hardware and Software Implementations

Figure 18:
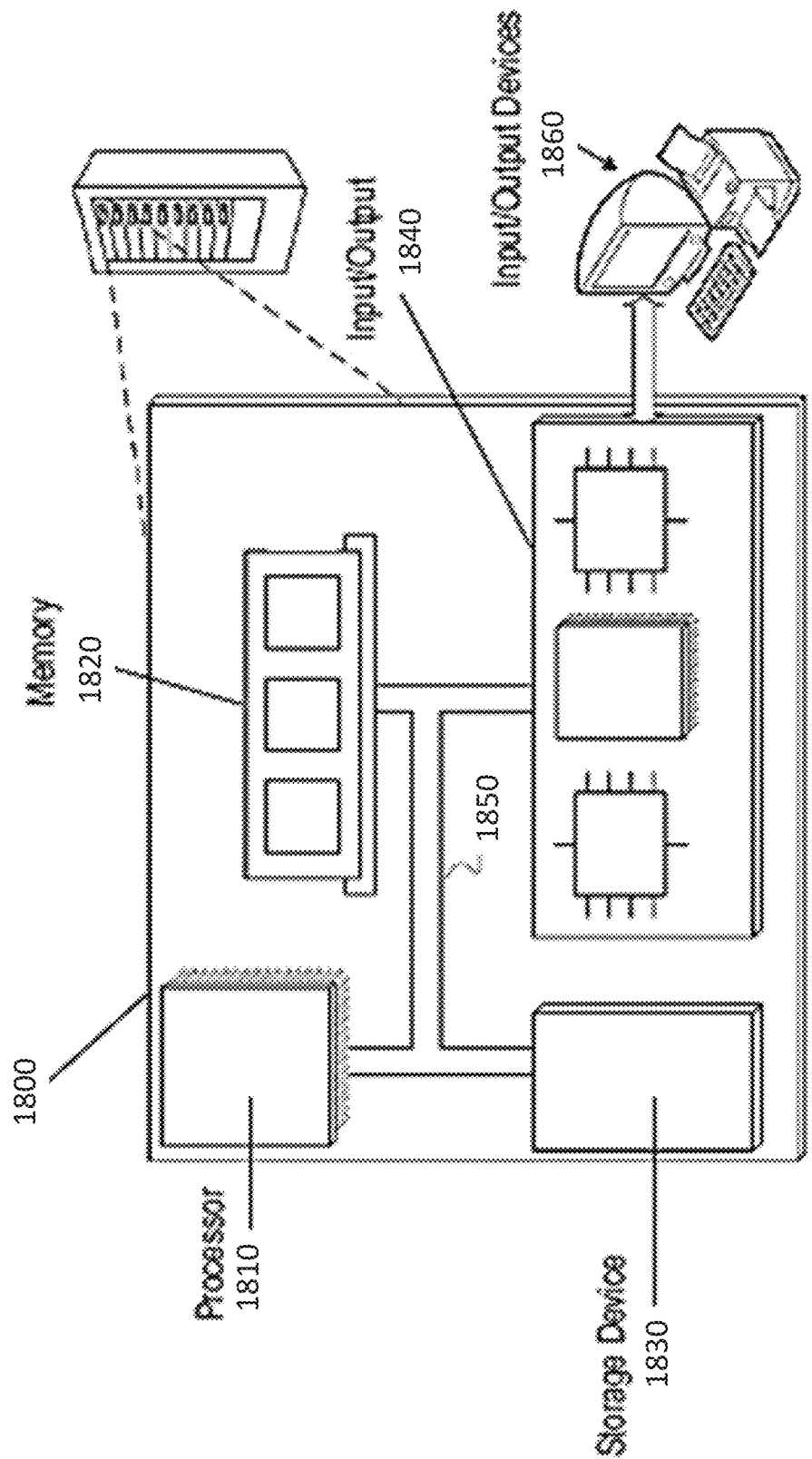
FIG. 18 is a diagram of an exemplary hardware and software systems implementing the systems and methods described herein.

FIG. 18 is a block diagram of an example computer system 1800 that may be used in implementing the technology described in this document. General-purpose computers, network appliances, mobile devices, or other electronic systems may also include at least portions of the system 1800. The system 1800 includes a processor 1810, a memory 1820, a storage device 1830, and an input/output device 1840. Each of the components 1810, 1820, 1830, and 1840 may be interconnected, for example, using a system bus 1850. The processor 1810 is capable of processing instructions for execution within the system 1800. In some implementations, the processor 1810 is a single-threaded processor. In some implementations, the processor 1810 is a multi-threaded processor. The processor 1810 is capable of processing instructions stored in the memory 1820 or on the storage device 1830.

The memory 1820 stores information within the system 1800. In some implementations, the memory 1820 is a non-transitory computer-readable medium. In some implementations, the memory 1820 is a volatile memory unit. In some implementations, the memory 1820 is a nonvolatile memory unit.

The storage device 1830 is capable of providing mass storage for the system 1800. In some implementations, the storage device 1830 is a non-transitory computer-readable medium. In various different implementations, the storage device 1830 may include, for example, a hard disk device, an optical disk device, a solid-date drive, a flash drive, or some other large capacity storage device. For example, the storage device may store long-term data (e.g., database data, file system data, etc.). The input/output device 1840 provides input/output operations for the system 1800. In some implementations, the input/output device 1840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1830 may be implemented in a distributed way over a network, for example as a server farm or a set of widely distributed servers, or may be implemented in a single computing device.

Although an example processing system has been described in FIG. 18, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; and magneto optical disks. The processor and the memory can be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for linearizing frequency chirp in a frequency-modulated continuous wave (FMCW) coherent LiDAR system, the method comprising:
   generating a continuous wave laser signal having a frequency characteristic, the frequency characteristic comprising a frequency chirp over a frequency band in at least one period;
   receiving a signal based on the generated laser signal, wherein the received signal is a reflected signal from an optical facet of the LiDAR system;
   mixing the received signal with a local oscillator signal to generate a mixed signal, the local oscillator signal having the frequency characteristic;
   determining a correction signal based on the mixed signal;
   using the correction signal to linearize the frequency chirp,
   determining at least one beat frequency based on the mixed signal;
   sampling the mixed signal at a rate equal to at least two times the beat frequency; and
   determining the correction signal based on the sampled signal.

2. A method for linearizing frequency chirp in a frequency-modulated continuous wave (FMCW) coherent LiDAR system, the method comprising:
generating a continuous wave laser signal having a frequency characteristic, the frequency characteristic comprising a frequency chirp over a frequency band in at least one period;
receiving a signal based on the generated laser signal, wherein the received signal is a reflected signal from an optical facet of the LiDAR system;
mixing the received signal with a local oscillator signal to generate a mixed signal, the local oscillator signal having the frequency characteristic;
determining at least one beat frequency based on the mixed signal;
sampling the mixed signal at a rate equal to at least two times the beat frequency;
determining a correction signal based on the mixed signal; and
using the correction signal to linearize the frequency chirp,
wherein determining at least one beat frequency of the mixed signal comprises determining a maximum beat frequency, and
wherein sampling the mixed signal is at a rate equal to at least two times the maximum beat frequency.

3. A method for linearizing frequency chirp in a frequency-modulated continuous wave (FMCW) coherent LiDAR system, the method comprising:
generating a continuous wave laser signal having a frequency characteristic, the frequency characteristic comprising a frequency chirp over a frequency band in at least one period;
receiving a signal based on the generated laser signal, wherein the received signal is a reflected signal from an optical facet of the LiDAR system;
mixing the received signal with a local oscillator signal, the local oscillator signal having the frequency characteristic;
determining at least one beat frequency based on the mixed signal;
sampling the mixed signal at a rate equal to at least two times the beat frequency; and
determining a correction signal based on the sampled signal,
wherein, for a given sample in the sampled mixed signal, the correction signal indicates a difference between the laser signal and an ideal signal.

4. The method of claim 3, wherein the ideal signal has an ideal frequency characteristic, the ideal frequency characteristic comprising a linear frequency chirp over the frequency band in the at least one period, and
wherein the difference is between the frequency characteristic of the laser signal and the ideal frequency characteristic.

5. The method of claim 4, wherein the linear frequency chirp comprises a first linear chirp having a positive slope and a second linear chirp having a negative slope.

6. The method of claim 4, determining the correction signal based on the sampled signal comprises:
determining an average frequency of the sampled signal; and
determining the ideal signal based on the average frequency.

7. The method of claim 1, wherein applying the correction signal to the laser signal comprises:
providing the correction signal to a modulator coupled to a laser, the laser configured to generate the continuous wave laser signal.

8. The method of claim 1, further comprising receiving a target reflected signal, wherein the received target reflected signal is a reflected signal from a target.

9. The method of claim 8, further comprising:
determining at least one of a range or a velocity of the target based on the received target reflected signal.

10. The method of claim 3, further comprising applying the correction signal to the laser signal.

11. A system for linearizing frequency chirp in a frequency-modulated continuous wave (FMCW) coherent LiDAR system, the system comprising:
a laser configured to generate a continuous wave laser signal having a frequency characteristic, the frequency characteristic comprising a frequency chirp over a frequency band in at least one period;
a mixer coupled to an output of the laser and configured to mix:
a received signal based on the generated laser signal, wherein the received signal is a reflected signal from an optical facet of the LiDAR system; and
a local oscillator signal having the frequency characteristic;
an analog-to-digital converter coupled to an output of the mixer and configured to sample the mixed signal at a rate equal to at least two times a beat frequency of the mixed signal; and
a processor coupled to an output of the converter and configured to determine a correction signal based on the sampled signal, and
using the correction signal to linearize the frequency characteristic of the local oscillator signal.

12. The system of claim 11, wherein the beat frequency is a maximum beat frequency and wherein the converter is configured to sample the mixed signal at a rate equal to at least two times the maximum beat frequency.

13. The system of claim 11, further comprising:
a scanner coupled to the output of the laser and configured to scan at least one of a reference reflector or a target with the generated laser signal.

14. The system of claim 13, wherein the mixer is configured to receive a reflection signal from the scanner, and
wherein the reflection signal is the reflection signal based on the scan of the reference reflector.

15. The system of claim 11, wherein, for a given sample in the sampled signal, the correction signal indicates a difference between the laser signal and an ideal signal.

16. The system of claim 15, wherein the ideal signal has an ideal frequency characteristic, the ideal frequency characteristic comprising a linear frequency chirp over the frequency band in the at least one period, and
wherein the difference is between the frequency characteristic of the laser signal and the ideal frequency characteristic.

17. The system of claim 16, wherein the linear frequency chirp comprises a first linear chirp having a positive slope and a second linear chirp having a negative slope.

18. The system of claim 16, wherein the processor is further configured to:
determine an average frequency of the sampled signal; and
determine the ideal signal based the average frequency.

19. The system of claim 11, further comprising a modulator coupled to the laser and configured to apply the correction signal to the laser signal.

\* \* \* \* \*